(12) United States Patent
Hisakado et al.

(10) Patent No.: US 12,461,295 B2
(45) Date of Patent: Nov. 4, 2025

(54) CIRCULARLY POLARIZING PLATE, ORGANIC ELECTROLUMINESCENT DISPLAY DEVICE, AND DISPLAY DEVICE

(71) Applicant: FUJIFILM Corporation, Tokyo (JP)

(72) Inventors: Yoshiaki Hisakado, Kanagawa (JP); Yuta Takahashi, Kanagawa (JP); Shinpei Yoshida, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 448 days.

(21) Appl. No.: 18/169,694

(22) Filed: Feb. 15, 2023

(65) Prior Publication Data

US 2023/0200192 A1   Jun. 22, 2023

Related U.S. Application Data

(63) Continuation of application No. PCT/JP2021/031140, filed on Aug. 25, 2021.

(30) Foreign Application Priority Data

Aug. 25, 2020  (JP) .................................. 2020-141548
Sep. 18, 2020  (JP) .................................. 2020-157626

(Continued)

(51) Int. Cl.
  *G02B 5/30*  (2006.01)
  *H10K 50/86* (2023.01)
  *H10K 59/80* (2023.01)

(52) U.S. Cl.
  CPC ......... *G02B 5/3016* (2013.01); *G02B 5/3083* (2013.01); *H10K 59/8791* (2023.02); *H10K 59/8793* (2023.02); *H10K 50/86* (2023.02)

(58) Field of Classification Search
  CPC .... G02B 5/3016; G02B 5/3083; G02B 5/305; G02F 1/13363; G02F 1/133636;
(Continued)

(56) References Cited

U.S. PATENT DOCUMENTS

2014/0284582 A1  9/2014  Saitoh et al.
2015/0042942 A1  2/2015  Hatanaka et al.
(Continued)

FOREIGN PATENT DOCUMENTS

JP   2004-177951 A   6/2004
JP   2005-037809 A   2/2005
(Continued)

OTHER PUBLICATIONS

Office Action, which was issued by the Japanese Patent Office on Aug. 6, 2024, in connection with Japanese Patent Application No. 2022-545667.

(Continued)

*Primary Examiner* — Angela M. Medich
(74) *Attorney, Agent, or Firm* — Edwards Neils LLC; Jean C. Edwards, Esq.

(57) ABSTRACT

A circularly polarizing plate in which tint unevenness in an oblique direction can be suppressed when the circularly polarizing plate is applied to an organic EL display device. The circularly polarizing plate includes a polarizer and a phase difference film laminated on one surface side of the polarizer, in which it has a moisture content of 1.8% or less, an absolute value of a chromaticity a* and chromaticity b* are 10 or less at any azimuthal angle, in a case where the chromaticity a* and b* are measured at all azimuthal angles with a polar angle of 40° from a normal direction of the circularly polarizing plate of a laminate, and when a reflectivity is measured at all azimuthal angles with a polar angle of 40° from the normal direction of the circularly polarizing plate of the laminate, the reflectivity is 3.0% or less at any azimuthal angle.

9 Claims, 2 Drawing Sheets

(30) Foreign Application Priority Data

| | | |
|---|---|---|
| Sep. 18, 2020 | (JP) | 2020-157672 |
| Jan. 25, 2021 | (JP) | 2021-009400 |
| Jan. 25, 2021 | (JP) | 2021-009402 |
| Feb. 22, 2021 | (JP) | 2021-026067 |
| Mar. 10, 2021 | (JP) | 2021-038457 |

(58) Field of Classification Search
CPC .......... G02F 1/133541; H10K 59/8791; H10K 59/8793; H10K 50/86; H10K 50/868
See application file for complete search history.

(56) References Cited

U.S. PATENT DOCUMENTS

| | | | |
|---|---|---|---|
| 2015/0114257 | A1 | 4/2015 | Takagi |
| 2017/0299880 | A1 | 10/2017 | Osato |
| 2017/0303349 | A1 | 10/2017 | Kim et al. |
| 2018/0093404 | A1 | 4/2018 | Hatano et al. |
| 2018/0149786 | A1 | 5/2018 | Lee et al. |
| 2019/0346605 | A1* | 11/2019 | Nevitt ................ B32B 7/023 |
| 2020/0079885 | A1 | 3/2020 | Tamura et al. |
| 2021/0054247 | A1* | 2/2021 | Yun ................ C09J 133/08 |

FOREIGN PATENT DOCUMENTS

| | | |
|---|---|---|
| JP | 2006-268033 A | 10/2006 |
| JP | 2007-140480 A | 6/2007 |
| JP | 2014-130352 A | 7/2014 |
| JP | 2014-209220 A | 11/2014 |
| JP | 2021-001972 A | 1/2021 |
| JP | 2021-002026 A | 1/2021 |
| KR | 10-2015-0018436 A | 2/2015 |
| KR | 10-2020-0045152 A | 5/2020 |
| WO | 2013/164984 A1 | 11/2013 |
| WO | 2016/047517 A1 | 3/2016 |
| WO | 2016/132606 A1 | 8/2016 |
| WO | 2016/140077 A1 | 9/2016 |
| WO | 2018/139638 A1 | 8/2018 |
| WO | 2018/216812 A1 | 11/2018 |
| WO | 2019/054441 A1 | 3/2019 |

OTHER PUBLICATIONS

Office Action, issued by the State Intellectual Property Office of China on May 21, 2025, in connection with Chinese Patent Application No. 202180052470.0.

Office Action, which was issued by the Japanese Patent Office on Dec. 26, 2023, in connection with Japanese Patent Application No. 2022-545667.

International Search Report issued in PCT/JP2021/031140 on Nov. 16, 2021.

Written Opinion issued in PCT/JP2021/031140 on Nov. 16, 2021.

International Preliminary Report on Patentability completed by WIPO on Feb. 28, 2023 in connection with International Patent Application No. PCT/JP2021/031140.

Office Action, issued by the Korean Intellectual Property Office on Feb. 18, 2025, in connection with Korean Patent Application No. 10-2023-7005698.

* cited by examiner

CIRCULARLY POLARIZING PLATE, ORGANIC ELECTROLUMINESCENT DISPLAY DEVICE, AND DISPLAY DEVICE

CROSS-REFERENCE TO RELATED APPLICATIONS

This application is a Continuation of PCT International Application No. PCT/JP2021/031140 filed on Aug. 25, 2021, which was published under PCT Article 21(2) in Japanese, and which claims priority under 35 U.S.C. § 119(a) to Japanese Patent Application No. 2020-141548 filed on Aug. 25, 2020, Japanese Patent Application No. 2021-009402 filed on Jan. 25, 2021, Japanese Patent Application No. 2020-157672 filed on Sep. 18, 2020, Japanese Patent Application No. 2020-157626 filed on Sep. 18, 2020, Japanese Patent Application No. 2021-009400 filed on Jan. 25, 2021, Japanese Patent Application No. 2021-026067 filed on Feb. 22, 2021, and Japanese Patent Application No. 2021-038457 filed on Mar. 10, 2021. The above applications are hereby expressly incorporated by reference, in their entirety, into the present application.

BACKGROUND OF THE INVENTION

1. Field of the Invention

The present invention relates to a circularly polarizing plate, an organic electroluminescent display device, and a display device.

2. Description of the Related Art

In recent years, the development of a polarizing plate (so-called broadband polarizing plate) capable of giving the same effect for rays of all wavelengths with respect to white light, which is a combined wave in which rays in a visible light range are mixed, has been promoted. In particular, due to the demand for thinning of the apparatus to which the polarizing plate is applied, the retardation layer contained in the polarizing plate is also required to be thinned.

In response to such a requirement, for example, in Example 9 of WO2018/216812A, there is disclosed a phase difference plate in which a polymerizable liquid crystal compound having reverse wavelength dispersibility is used as a polymerizable compound for use in the formation of an optically anisotropic layer, and different types of optically anisotropic layers exhibiting predetermined optical properties are laminated.

SUMMARY OF THE INVENTION

As a result of studying a polarizing plate having an optically anisotropic layer obtained by polymerizing a polymerizable liquid crystal composition containing the compound (polymerizable liquid crystal compound) described in WO2018/216812A, the present inventors have found that, in a case of observing a device to which the polarizing plate is applied from an oblique direction, a change in tint occurs depending on an azimuthal angle, in other words, tint unevenness occurs (hereinafter, the occurrence of tint unevenness in a case of being observed from an oblique direction and then in a case of changing the azimuthal angle, as described above, is simply referred to as "occurrence of tint unevenness in an oblique direction"). In particular, the above-mentioned problem is conspicuous in a case where such a polarizing plate is applied to a curved screen display, an in-vehicle display having a high aspect ratio, or the like.

In addition, in consideration of long-term use of various devices, it is also required that tint unevenness in a case of being observed from an oblique direction does not occur over time.

An object of the present invention is to provide a circularly polarizing plate in which tint unevenness in an oblique direction can be suppressed in a case where the circularly polarizing plate is applied to an organic EL display device (in particular, a curved screen display or an in-vehicle display having a high aspect ratio), and the tint unevenness in an oblique direction is less likely to occur over time.

Another object of the present invention is to provide an organic electroluminescent display device and a display device.

The present inventors have found that the foregoing objects can be achieved by the following configurations.

(1) A circularly polarizing plate comprising a polarizer and a phase difference film laminated on one surface side of the polarizer,
  in which the phase difference film has a moisture content of 1.8% or less,
  in a case where a chromaticity a* and a chromaticity b* are measured at all azimuthal angles with a polar angle of 40° from a normal direction of the circularly polarizing plate of a laminate which is obtained by bonding the circularly polarizing plate to an aluminum sheet so that the phase difference film in the circularly polarizing plate faces the aluminum sheet, an absolute value of the chromaticity a* and an absolute value of the chromaticity b* are 10 or less at any azimuthal angle, and
  in a case where a reflectivity is measured at all azimuthal angles with a polar angle of 40° from the normal direction of the circularly polarizing plate of the laminate, the reflectivity is 3.0% or less at any azimuthal angle.

(2) The circularly polarizing plate according to (1), in which the phase difference film includes an optically anisotropic layer (B) formed by fixing a twist-aligned rod-like liquid crystal compound with a thickness direction as a helical axis.

(3) The circularly polarizing plate according to (1) or (2), in which the phase difference film includes an optically anisotropic layer (A) exhibiting negative uniaxiality.

(4) The circularly polarizing plate according to any one of (1) to (3), in which the phase difference film has a thickness of 30 μm or less.

(5) The circularly polarizing plate according to any one of (1) to (4), in which the phase difference film is formed by laminating three optically anisotropic layers.

(6) The circularly polarizing plate according to any one of (1) to (5), in which the phase difference film is formed by laminating three optically anisotropic layers which are formed by fixing an aligned liquid crystal compound.

(7) The circularly polarizing plate according to any one of (1) to (6), in which the polarizer is formed of a composition containing a polymerizable liquid crystal compound, and
  the polarizer has a thickness of 8 μm or less.

(8) An organic electroluminescent display device comprising the circularly polarizing plate according to any one of (1) to (7).

(9) A display device comprising the circularly polarizing plate according to any one of (1) to (7),
  in which the circularly polarizing plate is disposed along a curved surface of the display device.

According to an aspect of the present invention, it is possible to provide a circularly polarizing plate in which tint unevenness in an oblique direction can be suppressed in a case where the circularly polarizing plate is applied to an organic EL display device (for example, a curved screen display or an in-vehicle display having a high aspect ratio), and the tint unevenness in an oblique direction is less likely to occur over time.

According to another aspect of the present invention, it is possible to provide an organic electroluminescent display device and a display device.

DESCRIPTION OF THE PREFERRED EMBODIMENTS

Figure 1:
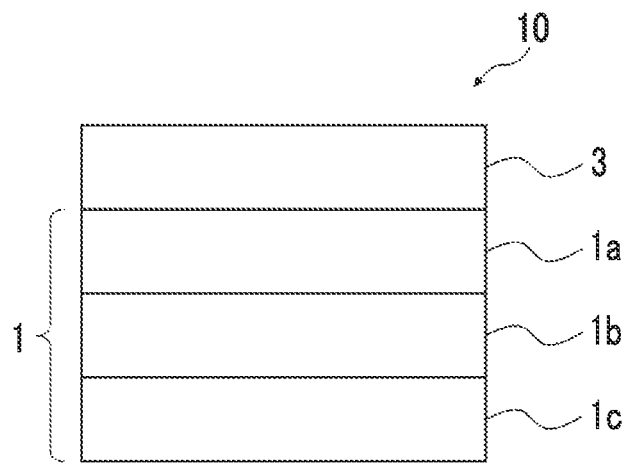
FIG. 1 is a schematic cross-sectional view showing an example of an embodiment of a circularly polarizing plate of the present invention.

Hereinafter, the present invention will be described in more detail. Any numerical range expressed using "to" in the present specification refers to a range including the numerical values before and after the "to" as a lower limit value and an upper limit value, respectively. First, the terms used in the present specification will be described.

An in-plane slow axis is defined at 550 nm unless otherwise specified.

In the present invention, $Re(\lambda)$ and $Rth(\lambda)$ represent an in-plane retardation at a wavelength $\lambda$, and a thickness direction retardation at a wavelength $\lambda$, respectively. The wavelength $\lambda$, is 550 nm unless otherwise specified.

In the present invention, $Re(\lambda)$ and $Rth(\lambda)$ are values measured at a wavelength of $\lambda$, in AxoScan (manufactured by Axometrics, Inc.). By inputting an average refractive index $((nx+ny+nz)/3)$ and a film thickness $(d\ (\mu m))$ in AxoScan, slow axis direction)(°)

$Re(\lambda)=R0(\lambda)$ $Rth(\lambda)=((nx+ny)/2-nz)\times d$ are calculated.

Although $R0(\lambda)$ is displayed as a numerical value calculated by AxoScan, $R0(\lambda)$ means $Re(\lambda)$.

In the present specification, the refractive indexes $nx$, $ny$, and $nz$ are measured using an Abbe refractometer (NAR-4T, manufactured by Atago Co., Ltd.) and using a sodium lamp ($\lambda=589$ nm) as a light source. In addition, in a case of measuring the wavelength dependence, it can be measured with a multi-wavelength Abbe refractometer DR-M2 (manufactured by Atago Co., Ltd.) in combination with a dichroic filter.

In addition, the values in Polymer Handbook (John Wiley & Sons, Inc.) and catalogs of various optical films can be used. Examples of average refractive index values for major optical films are given below: cellulose acylate (1.48), cycloolefin polymer (1.52), polycarbonate (1.59), polymethyl methacrylate (1.49), and polystyrene (1.59).

The term "light" in the present specification means an actinic ray or radiation, for example, an emission line spectrum of a mercury lamp, a far ultraviolet ray typified by an excimer laser, an extreme ultraviolet ray (EUV light), an X-ray, an ultraviolet ray, or an electron beam (EB).

Above all, an ultraviolet ray is preferable.

The term "visible light" in the present specification refers to light in a wavelength range of 380 to 780 nm. In addition, a measurement wavelength in the present specification is 550 nm unless otherwise specified.

In addition, in the present specification, a relationship between angles (for example, "orthogonal" or "parallel") is intended to include a range of errors acceptable in the art to which the present invention belongs. Specifically, it means that an angle is within an error range of less than ±10° with respect to the exact angle, and the error with respect to the exact angle is preferably within a range of ±5° or less and more preferably within a range of ±3° or less.

In the present specification, the vertical alignment of a rod-like liquid crystal compound refers to a state in which a major axis of the rod-like liquid crystal compound is arranged vertically and in the same direction with respect to a surface of a layer.

Here, "vertical" does not require that the major axis of the rod-like liquid crystal compound is strictly vertical with respect to the surface of the layer, but is intended to mean an alignment in which the tilt angle formed by the average molecular axis of the rod-like liquid crystal compound in the layer and the surface of the layer is 70° or more.

In addition, the "same direction" does not require that the major axis of the rod-like liquid crystal compound is arranged strictly in the same direction with respect to the surface of the layer, but is intended to mean that, in a case where the direction of the slow axis is measured at any 20 positions, the maximum difference between the slow axis directions among the slow axis directions at 20 positions (the difference between the two slow axis directions having a maximum difference among the 20 slow axis directions) is less than 10°.

In the present specification, the vertical alignment of a disk-like liquid crystal compound refers to a state in which a disk axis of the disk-like liquid crystal compound is arranged vertically and in the same direction with respect to the surface of the layer.

Here, the "vertical" does not require that the disk axis of the disk-like liquid crystal compound is strictly vertical with respect to the surface of the layer, but is intended to mean an alignment in which the tilt angle formed by the disc plane of the disk-like liquid crystal compound in the layer and the surface of the layer is 70° to 90°.

In addition, the same direction does not require that the disk axis of the disk-like liquid crystal compound is arranged strictly in the same direction with respect to the surface of the layer, but is intended to mean that, in a case where the direction of the in-plane slow axis is measured at any 20 positions in the plane, the maximum difference between the in-plane slow axis directions among the in-plane slow axis directions at 20 positions (the difference between the two in-plane slow axis directions having a maximum difference among the 20 in-plane slow axis directions) is less than 10°.

In the present specification, the optically anisotropic layer may be a layer exhibiting predetermined optical properties, and is preferably, for example, a layer formed by fixing an alignment state of an aligned liquid crystal compound.

The "fixed" state is a state in which the alignment of a liquid crystal compound is maintained. Specifically, the "fixed" state is more preferably a state in which, in a temperature range of usually 0° C. to 50° C. or in a temperature range of −30° C. to 70° C. under more severe conditions, the layer has no fluidity and a fixed alignment morphology can be maintained stably without causing a change in the alignment morphology due to an external field or an external force.

<<Circularly Polarizing Plate>>

A feature of the circularly polarizing plate according to the embodiment of the present invention is that a chromaticity a*, a chromaticity b*, and a reflectivity are within predetermined ranges in a case where a laminate obtained by bonding the circularly polarizing plate on an aluminum sheet is observed from a predetermined direction.

The polymerizable liquid crystal compound exhibiting reverse wavelength dispersibility used in WO2018/216812A exhibits excellent front reflection performance, but has a problem of a high reflectivity at a specific azimuthal angle in an oblique direction, resulting in the occurrence of tint unevenness in the oblique direction. On the other hand, the circularly polarizing plate according to the embodiment of the present invention solves the above-described problem by using a phase difference film that satisfies predetermined properties.

(One Embodiment of Circularly Polarizing Plate)

As shown in FIG. 1, a circularly polarizing plate 10, which is one embodiment of the present invention, includes a polarizer 3 and a phase difference film 1. The phase difference film 1 has an optically anisotropic layer (A) 1a, an optically anisotropic layer (B) 1b, and an optically anisotropic layer (C) 1c in this order. The polarizer 3 is disposed on the side of the phase difference film 1 opposite to an optically anisotropic layer (C) 1c side.

The optically anisotropic layer (A) 1a is an optically anisotropic layer exhibiting negative uniaxiality, and the details thereof will be described later.

The optically anisotropic layer (B) 1b is a layer formed by fixing a twist-aligned rod-like liquid crystal compound with a thickness direction as a helical axis, and the details thereof will be described later.

The optically anisotropic layer (C) 1c is a layer formed by fixing a vertically aligned rod-like liquid crystal compound or a horizontally aligned disk-like liquid crystal compound, and the details thereof will be described later.

(Different Embodiment of Circularly Polarizing Plate)

Figure 2:
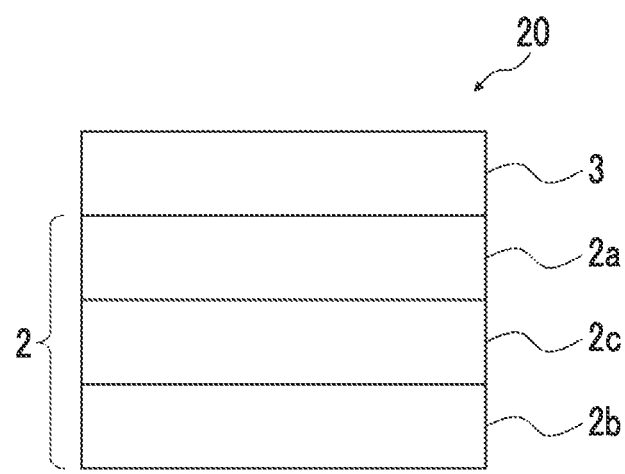
FIG. 2 is a schematic cross-sectional view showing an example of an embodiment of the circularly polarizing plate of the present invention.

As shown in FIG. 2, a circularly polarizing plate 20, which is a different embodiment of the present invention, includes a polarizer 3 and a phase difference film 2. The phase difference film 2 has an optically anisotropic layer (A) 2a, an optically anisotropic layer (C) 2c, and an optically anisotropic layer (B) 2b in this order. The polarizer 3 is disposed on the side of the phase difference film 2 opposite to an optically anisotropic layer (B) 2b side.

The optically anisotropic layer (A) 2a is an optically anisotropic layer exhibiting negative uniaxiality, and the details thereof will be described later.

The optically anisotropic layer (B) 2b is a layer formed by fixing a twist-aligned rod-like liquid crystal compound with a thickness direction as a helical axis, and the details thereof will be described later.

The optically anisotropic layer (C) 2c is a layer formed by fixing a vertically aligned rod-like liquid crystal compound or a horizontally aligned disk-like liquid crystal compound, and the details thereof will be described later.

The thickness of the circularly polarizing plate is not particularly limited, and is preferably 80 μm or less, more preferably 60 μm or less, and still more preferably 40 μm or less. The lower limit of the thickness of the circularly polarizing plate is not particularly limited, and is preferably 1 μm or more.

The absolute value of a chromaticity a* and the absolute value of a chromaticity b* are 10 or less at any azimuthal angle, in a case where the chromaticity a* and the chromaticity b* are measured at all azimuthal angles with a polar angle of 40° from a normal direction of the circularly polarizing plate of a laminate (hereinafter, also simply referred to as "specific laminate") which is obtained by bonding the circularly polarizing plate to an aluminum sheet so that the phase difference film in the circularly polarizing plate faces the aluminum sheet. The above-mentioned features will be described with reference to the accompanying drawings.

Figure 3:
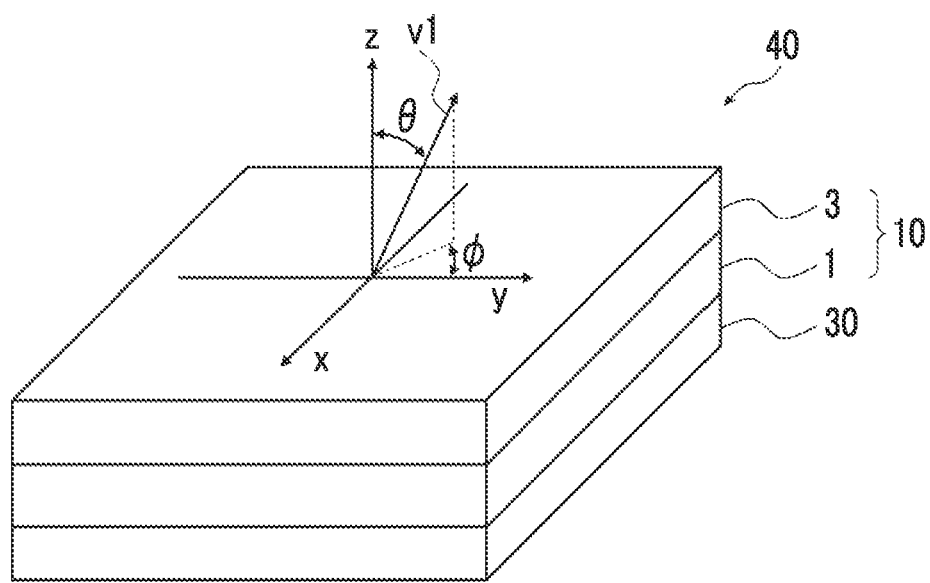
FIG. 3 is a view for explaining the definition of a polar angle and an azimuthal angle.

FIG. 3 shows a specific laminate 40 in which a circularly polarizing plate 10 and an aluminum sheet 30 are laminated. As shown in FIG. 3, the circularly polarizing plate 10 is composed of a polarizer 3 and a phase difference film 1, and the phase difference film 1 is disposed so as to face the aluminum sheet 30.

Next, first, the polar angle and the azimuthal angle will be described with reference to FIG. 3.

In FIG. 3, a plane of the circularly polarizing plate 10 (main surface; plane orthogonal to a thickness direction) is defined as an xy plane, and a y-axis direction is defined as an absorption axis of the polarizer 3. Therefore, in FIG. 3, the y-axis direction is a reference for the azimuthal angle of 0°. As shown in FIG. 3, an angle θ formed by a vector v1 and a z-axis is defined as a polar angle (an angle formed with the normal direction of the circularly polarizing plate 10), and an angle φ formed by the projection of the vector v1 onto the xy plane and the y-axis (the absorption axis of the polarizer 3) is defined as an azimuthal angle. That is, the polar angle means an angle formed with the normal direction of the circularly polarizing plate 10. In addition, the azimuthal angle represents an angle formed with the absorption axis of the polarizer 3.

Therefore, the polar angle of 40° means an angle in which θ in FIG. 3 is 40°. In addition, for example, the azimuthal angle of 45° means an angle in which φ in FIG. 3 is 45°.

In the present invention, in a case of expressing the azimuthal angle, the counterclockwise direction is represented by a positive value with reference to the absorption axis direction of the polarizer 3 as viewed from the circularly polarizing plate side of the specific laminate. Therefore, in FIG. 3, the azimuthal angle of 45° means an azimuth rotated by 45° counterclockwise from the reference y-axis.

In a case where the chromaticity a* is measured at all azimuthal angles (0° to 360°) with a polar angle of 40° from the normal direction of the circularly polarizing plate in the specific laminate described above, the absolute value of the chromaticity a* is 10 or less at any azimuthal angle. That is, this means that, in a case where the chromaticity a* is measured at each azimuthal angle position while changing the azimuthal angle in a range of 0° to 360° with a polar angle of 40° from the normal direction of the circularly polarizing plate in the specific laminate, as observed from the circularly polarizing plate side in the specific laminate, any of the absolute values of the obtained chromaticity a* is 10 or less.

The absolute value of the chromaticity a* is preferably 9 or less and more preferably 8 or less from the viewpoint that the effect of the present invention is more excellent. The lower limit of the absolute value of the chromaticity a* is not particularly limited, and may be, for example, 0.

In addition, in a case where the chromaticity b* is measured at all azimuthal angles (0° to 360°) with a polar angle of 40° from the normal direction of the circularly polarizing plate in the specific laminate described above, the absolute value of the chromaticity b* is 10 or less at any azimuthal angle. That is, this means that, in a case where the chromaticity b* is measured at each azimuthal angle position while changing the azimuthal angle in a range of 0° to 360° with a polar angle of 40° from the normal direction of the circularly polarizing plate in the specific laminate, as observed from the circularly polarizing plate side in the specific laminate, any of the absolute values of the obtained chromaticity b* is 10 or less.

The absolute value of the chromaticity b* is preferably 9 or less and more preferably 8 or less from the viewpoint that the effect of the present invention is more excellent. The lower limit of the absolute value of the chromaticity b* is not particularly limited, and may be, for example, 0.

The chromaticity a* and the chromaticity b* represent the chromaticity indicating hue and saturation in the L*a*b* color system standardized by Commission Internationale de l'Eclairage (CIE).

As a method for measuring the chromaticity a* and the chromaticity b*, for example, there is a method in which a spectrophotometric colorimeter (manufactured by Konica Minolta, Inc.) is placed at a predetermined position (a predetermined polar angle, a predetermined azimuthal angle) on the circularly polarizing plate side of the specific laminate, and the chromaticity a* and the chromaticity b* are measured under a fluorescent lamp.

In addition, in a case where a reflectivity is measured at all azimuthal angles (0° to 360°) with a polar angle of 40° from the normal direction of the circularly polarizing plate of the specific laminate described above, the reflectivity is 3.0% or less at any azimuthal angle. That is, this means that, in a case where the reflectivity is measured at each azimuthal angle position while changing the azimuthal angle in a range of 0° to 360° with a polar angle of 40° from the normal direction of the circularly polarizing plate in the specific laminate, as observed from the circularly polarizing plate side in the specific laminate, any of the obtained reflectivities is 3.0% or less.

The reflectivity is preferably 2.5% or less and more preferably 2.0% or less from the viewpoint that the effect of the present invention is more excellent. The lower limit of the reflectivity is not particularly limited, and may be, for example, 0%.

As a method for measuring the reflectivity, a detector is placed at a position with a polar angle of 40° from the normal direction of the circularly polarizing plate of the specific laminate, an incidence ray is incident from a direction with a polar angle of 40° at an azimuthal angle 180° different from the azimuthal angle where the detector is placed, and a procedure for measuring the reflectivity with the detector is carried out in an azimuthal angle range of 0° to 360° to measure the reflectivity at each azimuthal angle.

The reflectivity means a luminosity factor corrected reflectivity in a wavelength range of 400 to 750 nm. More specifically, the reflectivity refers to a reflectivity corrected for a luminosity factor according to JIS Z 8701.

In addition, in the above-described measurement, a standard plate (white calibration plate CS-A5 manufactured by Konica Minolta, Inc.) is used instead of the specific laminate, and the reflectivity is obtained based on the reflected light measured by the above-described procedure.

The aluminum sheet used for forming the specific laminate is a sheet having an aluminum foil as an outermost layer, and may be composed of an aluminum foil alone, or may be a laminate including a support and an aluminum foil disposed on the support.

In a case where the aluminum sheet is a laminate including a support and an aluminum foil disposed on the support, the type of the support is not particularly limited, and may be, for example, a resin substrate.

The reflectivity of the aluminum sheet alone is preferably 80% to 90%.

<Polarizer>

The polarizer may be a member having a function of converting natural light into specific linearly polarized light, and examples thereof include an absorption type polarizer.

The type of the polarizer is not particularly limited, and a commonly used polarizer can be used. Examples of the polarizer include an iodine-based polarizer, a dye-based polarizer using a dichroic dye, and a polyene-based polarizer. The iodine-based polarizer and the dye-based polarizer are generally prepared by adsorbing iodine or a dichroic dye on a polyvinyl alcohol, followed by stretching.

A protective film may be disposed on one side or both sides of the polarizer.

In addition, as described in WO2019/131943A and JP2017-083843A, a coating type polarizer prepared by using and applying a liquid crystal compound and a dichroic organic coloring agent (for example, a dichroic azo coloring agent used for a light-absorbing anisotropic film described in WO2017/195833A) without using a polyvinyl alcohol as a binder may be used as the polarizer.

This coating type polarizer is a technique for aligning a dichroic organic coloring agent by utilizing the alignment of a liquid crystal compound. As described in JP2012-083734A, in a case where the polymerizable liquid crystal compound exhibits smectic properties, it is preferable from the viewpoint of increasing the alignment degree. Alternatively, it is also preferable to crystallize the coloring agent from the viewpoint of increasing the alignment degree, as described in WO2018/186503A. WO2019/131943A describes a structure of a polymer liquid crystal that is preferable for increasing the alignment degree.

A polarizer in which a dichroic organic coloring agent is aligned by utilizing the aligning properties of a liquid crystal without stretching has the following characteristics. There are many advantages, such as being able to be made very thin with a thickness of about 0.1 μm to 8 μm; as described in JP2019-194685A, being difficult for cracks to occur in a case of being bent, and being less likely to undergo thermal deformation; and as described in Japanese Patent No. 6483486, exhibiting excellent durability even with a polarizing plate having a high transmittance of more than 50%.

Taking advantage of these advantages, it can be applied to applications where high brightness and small size and light weight are required, applications of a fine optical system, applications of molding to a portion having a curved surface, and applications to a flexible portion. Of course, in a case where a polarizer is prepared on a support, it is also possible to transfer the polarizer onto a given transfer target, peel off the support, and use only the polarizer.

In view of having the above-described characteristics, the circularly polarizing plate according to the embodiment of the present invention preferably uses a polarizer formed of a composition containing a polymerizable liquid crystal compound and having a thickness of 8 μm or less. More specifically, the composition preferably contains a polymerizable liquid crystal compound and a dichroic organic coloring agent. The type of the polymerizable liquid crystal compound is not particularly limited and may be, for example, a polymerizable liquid crystal compound (for example, a rod-like liquid crystal compound having a polymerizable group) used in a case of preparing a phase difference film which will be described later.

From the viewpoint of power saving, the transmittance of the polarizer (the luminosity corrected single transmittance) is preferably 40% or more, more preferably 44% or more, and still more preferably 50% or more.

<Phase Difference Film>

The moisture content of the phase difference film in the circularly polarizing plate according to the embodiment of the present invention is 1.8% or less. A desired effect can be obtained in a case where the moisture content of the phase difference film is within the above range. Above all, the moisture content of the phase difference film is preferably 1.5% or less and more preferably 1.0% or less, from the viewpoint that the effect of the present invention is more excellent. The lower limit of the moisture content of the phase difference film is not particularly limited, and is often 0% or more.

The moisture content of the phase difference film is a value measured after moisture conditioning for 24 hours or more in an environment with a temperature of 25° C. and a relative humidity of 60%, and the moisture content is measured by the Karl Fischer method.

The configuration of the phase difference film in the circularly polarizing plate according to the embodiment of the present invention is not particularly limited as long as the circularly polarizing plate is a circularly polarizing plate in which the chromaticity a*, the chromaticity b*, and the reflectivity satisfy the predetermined ranges.

Above all, from the viewpoint that the effect of the present invention is more excellent, the phase difference film preferably includes an optically anisotropic layer formed by fixing a twist-aligned rod-like liquid crystal compound with a thickness direction as a helical axis (corresponding to the optically anisotropic layer (B) shown in FIG. 1 and FIG. 2).

In addition, from the viewpoint that the effect of the present invention is more excellent, the phase difference film preferably includes an optically anisotropic layer exhibiting negative uniaxiality (corresponding to the optically anisotropic layer (A) shown in FIG. 1 and FIG. 2).

In addition, from the viewpoint that the effect of the present invention is more excellent, the phase difference film is preferably a phase difference film formed by laminating three optically anisotropic layers, and more preferably a phase difference film formed by laminating three optically anisotropic layers which are formed by fixing an aligned liquid crystal compound.

In particular, the phase difference film preferably includes three optically anisotropic layers, the optically anisotropic layer (A), the optically anisotropic layer (B), and the optically anisotropic layer (C), as shown in FIG. 1 and FIG. 2 described above.

In the following, specific examples of the configurations of the optically anisotropic layer (A) to the optically anisotropic layer (C) will be mainly described.

In the phase difference film, it is preferable that at least one of the optically anisotropic layer (A) or the optically anisotropic layer (B) is directly laminated with the optically anisotropic layer (C), the optically anisotropic layer (C) contains a photo-alignment polymer having a photo-alignment group, and the photo-alignment polymer having a photo-alignment group is present on the surface of the optically anisotropic layer (C) in contact with the optically anisotropic layer (A) or the optically anisotropic layer (B).

Here, the surface of the optically anisotropic layer (C) in contact with the optically anisotropic layer (A) or the optically anisotropic layer (B) refers to a surface layer region from the interface between the optically anisotropic layer (C) and the optically anisotropic layer (A) or the interface between the optically anisotropic layer (C) and the optically anisotropic layer (B) to 20 nm in the thickness direction of the optically anisotropic layer (C) (hereinafter, also simply referred to as "surface layer C").

In addition, the presence of the photo-alignment polymer in the surface layer C of the optically anisotropic layer (C) can be confirmed by, for example, time-of-flight secondary ion mass spectrometry (TOF-SIMS). The method described in "Surface Analysis Technology Library Secondary Ion Mass Spectrometry" edited by the Surface Science Society of Japan and published by Maruzen Co., Ltd. (1999) can be adopted as the TOF-SIMS.

Specifically, in a case where the photo-alignment polymer having a photo-alignment group is present on the surface of the optically anisotropic layer (C) in contact with the optically anisotropic layer (A) or the optically anisotropic layer (B), a fragment derived from the photo-alignment group is detected in the vicinity of the interface between the optically anisotropic layer (C) and the optically anisotropic layer (A) or the interface between the optically anisotropic layer (C) and the optically anisotropic layer (B).

In addition, the composition distribution in the thickness direction of the optically anisotropic layer (C) and the optically anisotropic layer (A) or the composition distribution in the thickness direction of the optically anisotropic layer (C) and the optically anisotropic layer (B) is analyzed by repeating irradiation with an ion beam and measurement with TOF-SIMS from the air interface side of either optically anisotropic layer. In the irradiation with an ion beam and the measurement with TOF-SIMS, the series of operations are repeated in which a component analysis is carried out on a region from the surface to 1 to 2 nm in a thickness direction, and then the component analysis is carried out on the next surface region by digging 1 to several 100 nm further in the thickness direction.

Then, the distribution of the photo-alignment polymer in the thickness direction of the optically anisotropic layer (C) is analyzed by measuring a secondary ion intensity derived from the unit having a photo-alignment group.

The type of the ion beam may be, for example, an ion beam from an argon gas cluster ion gun (Ar-GCIB gun).

(Optically Anisotropic Layer (A))

The optically anisotropic layer (A) is an optically anisotropic layer exhibiting negative uniaxiality.

The in-plane retardation of the optically anisotropic layer (A) at a wavelength of 550 nm is preferably 140 to 220 nm. The in-plane retardation of the optically anisotropic layer (A) is more preferably 150 to 200 nm from the viewpoint that the effect of the present invention is more excellent.

The angle formed by the in-plane slow axis of the optically anisotropic layer (A) and the absorption axis of the polarizer is not particularly limited, and is preferably 40° to 100°, more preferably 50° to 85°, and still more preferably 65° to 85°, as a preferred aspect, from the viewpoint that the effect of the present invention is more excellent. In addition, the angle formed by the in-plane slow axis of the optically anisotropic layer (A) and the absorption axis of the polarizer is preferably 5° to 60°, more preferably 5° to 50°, and still more preferably 5° to 25°, as another preferred aspect.

As one embodiment in a case where the optically anisotropic layer (A) is formed in an elongated shape, an angle θ1 formed by the longitudinal direction and the in-plane slow axis of the optically anisotropic layer (A) is not particularly limited, and is preferably 40° to 85°, more preferably 50° to 85°, and still more preferably 65° to 85°.

Further, from the viewpoint that the thickness of the optically anisotropic layer (A) can be reduced, the optically anisotropic layer (A) is preferably a layer formed of a liquid crystal compound, and more preferably an optically anisotropic layer formed by fixing an aligned liquid crystal compound.

More specifically, the optically anisotropic layer (A) is preferably a layer formed of a disk-like liquid crystal compound, and more preferably a layer formed by fixing a vertically aligned disk-like liquid crystal compound.

The type of the liquid crystal compound is not particularly limited. Generally, the liquid crystal compound can be classified into a rod-like type (rod-like liquid crystal compound) and a disk-like type (discotic liquid crystal compound) depending on the shape thereof. Further, the liquid crystal compound can be classified into a low molecular weight type and a high molecular weight type. The high molecular weight generally refers to having a polymerization degree of 100 or more (Polymer Physics-Phase Transition Dynamics, Masao Doi, p. 2, Iwanami Shoten Publishers, 1992). In the present invention, any liquid crystal compound can be used, but it is preferable to use a rod-like liquid crystal compound. Two or more types of rod-like liquid crystal compounds, or a mixture of a rod-like liquid crystal compound and a discotic liquid crystal compound may be used.

For example, rod-like liquid crystal compounds described in claim 1 of JP1999-513019A (JP-H11-513019A) and paragraphs [0026] to [0098] of JP2005-289980A can be preferably used as the rod-like liquid crystal compound.

For example, discotic liquid crystal compounds described in paragraphs [0020] to [0067] of JP2007-108732A and paragraphs [0013] to [0108] of JP2010-244038A can be preferably used as the discotic liquid crystal compound.

The liquid crystal compound preferably has a polymerizable group.

The type of the polymerizable group contained in the liquid crystal compound is not particularly limited, and is preferably a functional group capable of an addition polymerization reaction, more preferably a polymerizable ethylenic unsaturated group or a ring-polymerizable group, and still more preferably a (meth)acryloyl group, a vinyl group, a styryl group, or an allyl group.

The liquid crystal compound may be a liquid crystal compound having forward wavelength dispersibility or a liquid crystal compound having reverse wavelength dispersibility. In a case where the liquid crystal compound is a liquid crystal compound having forward wavelength dispersibility, it is preferable from the viewpoint that the production cost of the film is reduced and the durability is also improved.

In the present specification, the liquid crystal compound having forward wavelength dispersibility refers to a liquid crystal compound in which an in-plane retardation (Re) value decreases as a measurement wavelength increases in a case where the Re value in a visible light range of an optically anisotropic layer prepared using this liquid crystal compound is measured. On the other hand, the liquid crystal compound having reverse wavelength dispersibility refers to a liquid crystal compound in which the Re value increases as the measurement wavelength increases in a case where the Re value is measured similarly.

The optically anisotropic layer (A) may be a polymer film containing a resin having a negative intrinsic birefringence.

The resin having a negative intrinsic birefringence has a slow axis in a direction orthogonal to a stretching direction. In other words, the resin having a negative intrinsic birefringence is a resin in which the refractive index in a stretching direction is smaller than the refractive index in a direction orthogonal to the stretching direction.

In addition, examples of the resin having a negative intrinsic birefringence include polystyrene-based polymers including a homopolymer of styrene or a styrene derivative (for example, polystyrene or fluoropolystyrene) and a copolymer of styrene or a styrene derivative and any monomer; polyacrylonitrile polymers; (meth)acrylic polymers such as polymethyl methacrylate; polyester-based resins; multi-component copolymers thereof; and cellulose compounds such as cellulose ester. More specific examples of the resin having a negative intrinsic birefringence include polymethyl methacrylate, polystyrene, fluoropolystyrene, polyvinyl naphthalene, and fumaric acid ester-based resin.

The thickness of the optically anisotropic layer (A) is not particularly limited. In a case where the optically anisotropic layer (A) is a layer formed of a disk-like liquid crystal compound, the thickness of the optically anisotropic layer (A) is preferably 0.5 to 5 μm and more preferably 0.5 to 2 μm, from the viewpoint of the balance between thinning and handleability.

(Optically Anisotropic Layer (B))

The optically anisotropic layer (B) is a layer formed by fixing a twist-aligned rod-like liquid crystal compound with a thickness direction as a helical axis. The optically anisotropic layer (B) is preferably a layer formed by fixing a so-called chiral nematic phase having a helical structure. In a case of forming the above phase, it is preferable to use a mixture of a liquid crystal compound showing a nematic liquid crystal phase and a chiral agent which will be described later.

The meaning of the "fixed" state is as described above.

The value of a product Δnd of a refractive index anisotropy Δn of the optically anisotropic layer (B) measured at a wavelength of 550 nm and a thickness d of the optically anisotropic layer (B) is not particularly limited, and is preferably 140 to 220 nm. The Δnd is more preferably 150 to 210 nm and still more preferably 160 to 200 nm from the viewpoint of further suppressing the tint unevenness.

The refractive index anisotropy Δn means a refractive index anisotropy of an optically anisotropic layer.

The Δnd is measured using an AxoScan (polarimeter) device of Axometrics, Inc. and using device analysis software of Axometrics, Inc.

The twisted angle of the liquid crystal compound (twisted angle of an alignment direction of the liquid crystal compound) is preferably in a range of 90°±30° (within a range of 60° to) 120°. From the viewpoint of further suppressing the tint unevenness, the twisted angle of the liquid crystal compound is more preferably in a range of 90°±20° (within a range of 70° to) 110° and still more preferably in a range of 90°±10° (within a range of 80° to 100°).

The twisted angle is measured using an AxoScan (polarimeter) device of Axometrics, Inc. and using device analysis software of Axometrics, Inc.

In addition, the expression "the liquid crystal compound is twist-aligned" is intended to mean that the liquid crystal compound from one main surface to the other main surface of the optically anisotropic layer (B) is twisted around the thickness direction of the optically anisotropic layer (B) as an axis. Along with this, the alignment direction (in-plane slow axis direction) of the liquid crystal compound varies depending on the position in the thickness direction of the optically anisotropic layer (B).

The thickness of the optically anisotropic layer (B) is not particularly limited, and is preferably 0.5 to 5 μm and more preferably 0.5 to 2 μm, from the viewpoint of the balance between thinning and handleability.

The in-plane slow axis of the optically anisotropic layer (A) is preferably parallel to the in-plane slow axis on the surface of the optically anisotropic layer (B) on the optically anisotropic layer (A) side. Therefore, in a case where the optically anisotropic layer (A) and the optically anisotropic layer (B) are of an elongated shape, the angle formed by the longitudinal direction and the in-plane slow axis on the surface of the optically anisotropic layer (B) on the optically anisotropic layer (A) side preferably corresponds to 01 described above.

In addition, the in-plane slow axis on the surface of the optically anisotropic layer (B) on the optically anisotropic layer (A) side, and the in-plane slow axis on the surface of the optically anisotropic layer (B) opposite to the optically anisotropic layer (A) side preferably form the above-mentioned twisted angle (within a range of 90°±30°). Above all, it is preferable that the in-plane slow axis on the surface of the optically anisotropic layer (B) opposite to the optically anisotropic layer (A) side rotates clockwise by a predetermined angle (within a range of 90°±30°) with reference to the in-plane slow axis on the surface of the optically anisotropic layer (B) on the optically anisotropic layer (A) side.

The type of the liquid crystal compound used for forming the optically anisotropic layer (B) is not particularly limited, and examples thereof include the compounds exemplified as the liquid crystal compounds used for forming the optically anisotropic layer (A).

A variety of known chiral agents can be used as the chiral agent for use in the formation of the twisted alignment of a liquid crystal compound. The chiral agent has a function of inducing a helical structure of a liquid crystal compound. The chiral compound may be selected according to the intended purpose, since the induced helical sense or helical pitch differs depending on the compound.

A known compound can be used as the chiral agent, but it preferably has a cinnamoyl group. Examples of the chiral agent include the compounds described in "Liquid Crystal Device Handbook, Chapter 3, Section 4-3, chiral agents for TN and STN, p. 199, edited by the 142nd Committee of the Japan Society for the Promotion of Science, 1989", and JP2003-287623A, JP2002-302487, JP2002-080478A, JP2002-080851A, JP2010-181852A, JP2014-034581A, and the like.

The chiral agent generally contains an asymmetric carbon atom, but an axially asymmetric compound or a planarly asymmetric compound that does not contain an asymmetric carbon atom can also be used as the chiral agent. Examples of the axially asymmetric compound or the planarly asymmetric compound include binaphthyl, helicene, paracyclophane, and derivatives thereof. The chiral agent may have a polymerizable group.

In a case where both the chiral agent and the liquid crystal compound have a polymerizable group, a polymer having a repeating unit derived from the polymerizable liquid crystal compound and a repeating unit derived from the chiral agent can be formed by the polymerization reaction of the polymerizable chiral agent with the polymerizable liquid crystal compound. In this aspect, the polymerizable group of the polymerizable chiral agent is preferably a group of the same type as the polymerizable group of the polymerizable liquid crystal compound. Therefore, the polymerizable group of the chiral agent is preferably an unsaturated polymerizable group, an epoxy group, or an aziridinyl group, more preferably an unsaturated polymerizable group, and particularly preferably an ethylenically unsaturated polymerizable group.

In addition, the chiral agent may be a liquid crystal compound.

An isosorbide derivative, an isomannide derivative, a binaphthyl derivative, and the like are preferable as the chiral agent. A commercially available product such as LC-756 (manufactured by BASF SE) may be used as the isosorbide derivative.

The content of the chiral agent in the optically anisotropic layer (B) is preferably 0.01 to 200 mol % and more preferably 1 to 30 mol % with respect to the total molar amount of the liquid crystal compound.

The optically anisotropic layer (B) may contain materials other than the above-mentioned materials.

Examples of other materials include a surfactant, an alignment control agent, and a polymer used in a case of a method for producing an optically anisotropic layer (B) which will be described later.

(Optically Anisotropic Layer (C))

The optically anisotropic layer (C) is a layer formed by fixing a vertically aligned rod-like liquid crystal compound or a horizontally aligned disk-like liquid crystal compound.

From the viewpoint of usefulness that can be used as a compensation layer of a circularly polarizing plate or a display device, the layer formed by fixing a vertically aligned rod-like liquid crystal compound is preferably a positive C-plate, and the layer formed by fixing a horizontally aligned disk-like liquid crystal compound is preferably a negative C-plate.

Here, the positive C-plate (C-plate which is positive) and the negative C-plate (C-plate which is negative) are defined as follows.

The positive C-plate satisfies a relationship of Expression (C1) and the negative C-plate satisfies a relationship of Expression (C2) assuming that a refractive index in a film in-plane slow axis direction (in a direction in which an in-plane refractive index is maximum) is defined as nx, a refractive index in an in-plane direction orthogonal to the in-plane slow axis is defined as ny, and a refractive index in a thickness direction is defined as nz. It should be noted that the positive C-plate has an Rth showing a negative value and the negative C-plate has an Rth showing a positive value.

$$nz > nx \approx ny \qquad \text{Expression (C1)}$$

$$nz < nx \approx ny \qquad \text{Expression (C2)}$$

It should be noted that the symbol "≈" encompasses not only a case where the both sides are completely the same as each other but also a case where the both sides are substantially the same as each other.

The expression "substantially the same" means that, for example, a case where the absolute value of (nx−ny)×d (where d is a thickness of a film) is 0 to 10 nm and preferably 0 to 5 nm is also included in "nx≤ny".

The in-plane retardation of the optically anisotropic layer (C) at a wavelength of 550 nm is not particularly limited, and is preferably 0 to 10 nm. From the viewpoint of further suppressing the tint unevenness, the in-plane retardation of the optically anisotropic layer (C) is more preferably 0 to 5 nm.

In a case where the optically anisotropic layer (C) is a layer formed by fixing a vertically aligned rod-like liquid crystal compound, the thickness direction retardation of the optically anisotropic layer (C) at a wavelength of 550 nm is preferably −140 to −20 nm, more preferably −130 to −30 nm, and still more preferably −120 to −40 nm.

In a case where the optically anisotropic layer (C) is a layer formed by fixing a horizontally aligned disk-like liquid crystal compound, the thickness direction retardation of the optically anisotropic layer (C) at a wavelength of 550 nm is preferably 20 to 140 nm, more preferably 30 to 130 nm, and still more preferably 40 to 120 nm.

The upper limit of the thickness of the phase difference film is preferably 30 µm or less, more preferably 20 µm or less, still more preferably 10 µm or less, and particularly preferably 5 or less. The lower limit of the thickness of the phase difference film is preferably 1 µm or more. The thickness of the phase difference film refers to a thickness including an adhesive in a case where the optically anisotropic layer is bonded with an adhesive or the like.

<Other Members>

The circularly polarizing plate may further include other members.

The circularly polarizing plate may include a substrate.

The substrate is preferably a transparent substrate. The transparent substrate is intended to refer to a substrate having a visible light transmittance of 60% or more, which preferably has a visible light transmittance of 80% or more and more preferably 90% or more.

The thickness direction retardation value (Rth(550)) of the substrate at a wavelength of 550 nm is not particularly limited, and is preferably −110 to 110 nm and more preferably −80 to 80 nm.

The in-plane retardation value (Re(550)) of the substrate at a wavelength of 550 nm is not particularly limited, and is preferably 0 to 50 nm, more preferably 0 to 30 nm, and still more preferably 0 to 10 nm.

A polymer having excellent optical performance transparency, mechanical strength, heat stability, moisture shielding property, isotropy, and the like is preferable as the material for forming the substrate.

Examples of the polymer film that can be used as the substrate include a cellulose acylate film (for example, a cellulose triacetate film (refractive index: 1.48), a cellulose diacetate film, a cellulose acetate butyrate film, or a cellulose acetate propionate film), a polyolefin film such as polyethylene or polypropylene, a polyester film such as polyethylene terephthalate or polyethylene naphthalate, a polyether sulfone film, a polyacrylic film such as polymethyl methacrylate, a polyurethane film, a polycarbonate film, a polysulfone film, a polyether film, a polymethylpentene film, a polyether ketone film, a (meth)acrylic nitrile film, and a film of a polymer having an alicyclic structure (a norbornene-based resin (ARTON: trade name, manufactured by JSR Corporation), or an amorphous polyolefin (ZEONEX: trade name, manufactured by Zeon Corporation)).

Above all, the material for the polymer film is preferably triacetyl cellulose, polyethylene terephthalate, or a polymer having an alicyclic structure, and more preferably triacetyl cellulose.

The substrate may contain various additives (for example, an optical anisotropy adjuster, a wavelength dispersion adjuster, a fine particle, a plasticizer, an ultraviolet inhibitor, a deterioration inhibitor, and a release agent).

The thickness of the substrate is not particularly limited, and is preferably 10 to 200 µm, more preferably 10 to 100 µm, and still more preferably 20 to 90 µm. In addition, the substrate may consist of a plurality of laminated sheets. In order to improve the adhesion of the substrate to the layer provided thereon, the surface of the substrate may be subjected to a surface treatment (for example, a glow discharge treatment, a corona discharge treatment, an ultraviolet (UV) treatment, or a flame treatment).

In addition, an adhesive layer (undercoat layer) may be provided on the substrate.

In addition, in order to impart slipperiness in a transport step and prevent a back surface and a front surface from sticking to each other after winding, a polymer layer in which inorganic particles having an average particle diameter of about 10 to 100 nm are mixed in a solid content mass ratio of 5% to 40% by mass may be disposed on one side of the substrate.

The substrate may be a so-called temporary support. That is, the substrate may be peeled off from the optically anisotropic layer after carrying out the production method of the present invention.

In addition, the surface of the substrate may be directly subjected to a rubbing treatment. That is, a substrate that has been subjected to a rubbing treatment may be used. The direction of the rubbing treatment is not particularly limited, and an optimum direction is appropriately selected according to the direction in which the liquid crystal compound is desired to be aligned.

A treatment method widely adopted as a liquid crystal alignment treatment step of a liquid crystal display (LCD) can be applied for the rubbing treatment. That is, a method of obtaining alignment by rubbing the surface of the substrate in a certain direction with paper, gauze, felt, rubber, nylon fiber, polyester fiber, or the like can be used.

An alignment film may be disposed on the substrate.

The alignment film can be formed by means such as rubbing treatment of an organic compound (preferably a polymer), oblique vapor deposition of an inorganic compound, formation of a layer having microgrooves, or accumulation of an organic compound (for example, ω-tricosanoic acid, dioctadecylmethylammonium chloride, or methyl stearate) by the Langmuir-Blodgett method (LB film).

Further, there is also known an alignment film capable of expressing an alignment function by application of an electric field, application of a magnetic field, or irradiation with light (preferably polarized light).

In addition, in the circularly polarizing plate, an adhesion layer may be disposed between the layers. Examples of the adhesion layer include known pressure sensitive adhesive layers and adhesive layers.

As described in JP1999-149015A (JP-H11-149015A), in general, it is preferable to adjust the refractive index of an adhesive or a pressure sensitive adhesive for each of the layers forming a laminated wavelength plate or a circularly polarizing plate, from the viewpoint of suppressing reflection by adjusting the refractive index between the layers. The difference in refractive index from an object to be bonded is preferably 0.1 or less, more preferably 0.08 or less, still more preferably 0.06 or less, and most preferably 0.03 or less.

A high-refractive adhesive or a high-refractive pressure sensitive adhesive may be used in a case of disposing the adhesion layer between optically anisotropic layers formed of polymerizable liquid crystals.

In order to increase the refractive index, it is also preferable to use a high-refractive monomer or a high-refractive metal fine particle.

The high-refractive monomer preferably has a benzene ring skeleton in a molecule thereof. Examples of the monofunctional monomer having a benzene ring skeleton in a molecule thereof include ethoxylated o-phenylphenol (meth)acrylate, o-phenylphenol glycidyl ether (meth)acrylate, para-cumylphenoxyethylene glycol (meth)acrylate, 2-methacryloyloxyethyl phthalate, 2-acryloyloxyethyl phthalate, 2-acryloyloxyethyl-2-hydroxyethyl phthalate, 2-acryloyloxypropyl phthalate, phenoxyethyl (meth)acrylate, EO-modified phenol (meth)acrylate, phenoxydiethylene glycol (meth)acrylate, EO-modified nonylphenol (meth)acrylate, PO-modified nonylphenol (meth)acrylate, phenyl glycidyl ether (meth)acrylate, neopentyl glycol benzoate (meth)acrylate, nonylphenoxypolyethylene glycol (meth)acrylate, ECH-modified phenoxy (meth)acrylate, benzyl (meth)acrylate, and vinyl carbazole.

Examples of the component constituting the inorganic particle include a metal oxide, a metal nitride, a metal oxynitride, and a simple substance of metal. Examples of the metal atom contained in the metal oxide, the metal nitride, the metal oxynitride, and the simple substance of metal include a titanium atom, a silicon atom, an aluminum atom, a cobalt atom, and a zirconium atom. Specific examples of the inorganic particle include inorganic oxide particles such as an alumina particle, an alumina hydrate particle, a silica particle, a zirconia particle, and a clay mineral (for example, smectite). A zirconium oxide fine particle is preferable from the viewpoint of refractive index. The refractive index can be adjusted to a predetermined value by changing the amount of inorganic fine particles. The average particle diameter of the inorganic fine particles in the layer is preferably 1 to 120 nm, more preferably 1 to 60 nm, and still more preferably 2 to 40 nm in a case where zirconium oxide is used as a main component.

<Method for Producing Circularly Polarizing Plate and Method for Producing Phase Difference Film>

The method for producing the above-mentioned circularly polarizing plate is not particularly limited, and a known method can be adopted. For example, there is a method of bonding a polarizer and a phase difference film. At the time of bonding, an adhesion layer can be used, if necessary.

In addition, the method for producing the above-mentioned phase difference film is not particularly limited, and a known method can be adopted. In particular, the method for producing the above-mentioned phase difference film can be continuously carried out by roll-to-roll processing.

For example, the phase difference film can be produced by preparing an optically anisotropic layer (A) to an optically anisotropic layer (C) each exhibiting predetermined optical properties, and bonding the optically anisotropic layers and a substrate (for example, an elongated substrate) in a predetermined order through an adhesion layer (for example, a pressure sensitive adhesive layer or an adhesive layer).

In addition, the phase difference film may be produced by sequentially preparing an optically anisotropic layer (A) to an optically anisotropic layer (C) on a substrate by using polymerizable liquid crystal compositions which will be described later. For example, the phase difference film may be produced in such a manner that a polymerizable liquid crystal composition is applied onto a substrate to form an optically anisotropic layer (C), a polymerizable liquid crystal composition is applied onto the optically anisotropic layer (C) to form an optically anisotropic layer (B), and further, a polymerizable liquid crystal composition is applied onto the optically anisotropic layer (B) to form an optically anisotropic layer (A).

In addition, the above-mentioned method of bonding an optically anisotropic layer and the above-mentioned method of forming an optically anisotropic layer using a polymerizable liquid crystal composition may be combined. More specifically, for example, there is a method in which a polymerizable liquid crystal composition is applied onto a substrate to form an optically anisotropic layer (C), a polymerizable liquid crystal composition is applied onto the optically anisotropic layer (C) to form an optically anisotropic layer (B) to obtain a laminate, and then a separately prepared optically anisotropic layer (A) and the laminate are bonded to each other to produce a phase difference film.

Hereinafter, the method for producing each of the layers will be described in detail.

Hereinafter, each member will be described in detail.

The optically anisotropic layer (A) to the optically anisotropic layer (C) included in the phase difference film are each preferably a layer in which an aligned liquid crystal compound is fixed.

The optically anisotropic layer produced in the present invention is preferably a layer formed by fixing a liquid crystal compound having a polymerizable group (a rod-like liquid crystal compound or discotic liquid crystal compound having a polymerizable group) by means of polymerization or the like.

Each of the optically anisotropic layer (A) to the optically anisotropic layer (C) is preferably formed of a polymerizable liquid crystal composition. More specifically, it is preferable that a polymerizable liquid crystal composition is applied to form a composition layer, the liquid crystal compound in the composition layer is aligned, and then a curing treatment is carried out to form a predetermined optically anisotropic layer.

The polymerizable liquid crystal composition is a composition containing a liquid crystal compound having a polymerizable group. Various components contained in the polymerizable liquid crystal composition will be described in detail later.

Hereinafter, the above procedure will be described in detail.

The procedure for forming a composition layer described above is not particularly limited, and examples thereof include a method in which a polymerizable liquid crystal composition is applied onto a substrate and, if necessary, a drying treatment is carried out.

The coating method is not particularly limited, and examples thereof include a wire bar coating method, an extrusion coating method, a direct gravure coating method, a reverse gravure coating method, and a die-coating method.

The film thickness of the composition layer is not particularly limited and is preferably 0.1 to 20 µm, more preferably 0.2 to 15 µm, and still more preferably 0.5 to 10 µm.

Next, the formed composition layer is subjected to an alignment treatment to align a polymerizable liquid crystal compound in the composition layer.

The alignment treatment can be carried out by drying the coating film at room temperature or by heating the coating film. In a case of a thermotropic liquid crystal compound, the liquid crystal phase formed by the alignment treatment can generally be transferred by a change in temperature or pressure. In a case of a lyotropic liquid crystal compound, the liquid crystal phase formed by the alignment treatment can also be transferred by a compositional ratio such as an amount of solvent.

The conditions in a case of heating the composition layer are not particularly limited, and the heating temperature is preferably 50° C. to 250° C. and more preferably 50° C. to 150° C., and the heating time is preferably 10 seconds to 10 minutes.

In addition, after the composition layer is heated, the coating film may be cooled, if necessary, before a curing treatment (light irradiation treatment) which will be described later. The cooling temperature is preferably 20° C. to 200° C. and more preferably 30° C. to 150° C.

Next, the composition layer in which the polymerizable liquid crystal compound is aligned is subjected to a curing treatment.

The method of the curing treatment carried out on the composition layer in which the polymerizable liquid crystal compound is aligned is not particularly limited, and examples thereof include a light irradiation treatment and a heat treatment. Above all, from the viewpoint of manufacturing suitability, a light irradiation treatment is preferable, and an ultraviolet irradiation treatment is more preferable.

The irradiation conditions of the light irradiation treatment are not particularly limited, and an irradiation amount of 50 to 1,000 mJ/cm$^2$ is preferable.

The atmosphere during the light irradiation treatment is not particularly limited and is preferably a nitrogen atmosphere.

Although the method of applying the polymerizable liquid crystal composition to form the composition layer has been described above, a composition layer may be separately formed and transferred onto a predetermined substrate.

The polymerizable liquid crystal composition used above contains the above-mentioned liquid crystal compound having a polymerizable group, and other components used as necessary (for example, a chiral agent, a polymerization initiator, a polymerizable monomer, a surfactant, a polymer, a photo-alignment polymer, and a solvent).

The content of the liquid crystal compound in the polymerizable liquid crystal composition is not particularly limited, and is preferably 60% by mass or more and more preferably 70% by mass or more with respect to the total solid content in the polymerizable liquid crystal composition, from the viewpoint that the alignment state of the liquid crystal compound can be easily controlled. The upper limit of the content of the liquid crystal compound is not particularly limited, and is preferably 99% by mass or less and more preferably 97% by mass or less.

The solid content means a component capable of forming an optically anisotropic layer from which a solvent has been removed, and even in a case where a component itself is in a liquid state, such a component is regarded as the solid content.

As described above, the polymerizable liquid crystal composition may contain components other than the liquid crystal compound.

For example, the polymerizable liquid crystal composition may contain a polymerization initiator. In a case where the polymerizable liquid crystal composition contains the polymerization initiator, the polymerization of the liquid crystal compound having a polymerizable group proceeds more efficiently.

The polymerization initiator may be, for example, a known polymerization initiator, examples of which include a photopolymerization initiator and a thermal polymerization initiator, among which a photopolymerization initiator is preferable.

The content of the polymerization initiator in the polymerizable liquid crystal composition is not particularly limited, and is preferably 0.01% to 20% by mass and more preferably 0.5% to 10% by mass with respect to the total solid content in the polymerizable liquid crystal composition.

The polymerizable liquid crystal composition may contain a chiral agent.

The type of the chiral agent is not particularly limited, and examples thereof include known chiral agents.

The content of the chiral agent in the polymerizable liquid crystal composition is not particularly limited, and is preferably 0.01% to 20% by mass and more preferably 0.3% to 10% by mass with respect to the total solid content in the polymerizable liquid crystal composition.

The polymerizable liquid crystal composition may contain a polymerizable monomer different from the liquid crystal compound having a polymerizable group. Examples of the polymerizable monomer include a radically polymerizable compound and a cationically polymerizable compound, among which a polyfunctional radically polymerizable monomer is preferable. Examples of the polymerizable monomer include polymerizable monomers described in paragraphs [0018] to [0020] of JP2002-296423A.

The content of the polymerizable monomer in the polymerizable liquid crystal composition is not particularly limited, and is preferably 1% to 50% by mass and more preferably 5% to 30% by mass with respect to the total mass of the liquid crystal compound.

The polymerizable liquid crystal composition may contain a surfactant. Examples of the surfactant include an alkyl ether-based compound, a silicone-based compound, and a fluorine-based compound, which are conventionally known, among which a fluorine-based compound is preferable. Specific examples of the surfactant include compounds described in paragraphs [0028] to [0056] of JP2001-330725A and compounds described in paragraphs [0069] to [0126] of JP2003-295212.

The polymerizable liquid crystal composition may contain a polymer. Examples of the polymer include cellulose esters. Examples of the cellulose ester include cellulose esters described in paragraph [0178] of JP2000-155216A.

The content of the polymer in the polymerizable liquid crystal composition is not particularly limited, and is preferably 0.1% to 10% by mass and more preferably 0.1% to 8% by mass with respect to the total mass of the liquid crystal compound.

The polymerizable liquid crystal composition may contain an additive (alignment control agent) that promotes horizontal alignment or vertical alignment in order to bring a liquid crystal compound into a horizontal alignment state or a vertical alignment state, in addition to the foregoing components.

The polymerizable liquid crystal composition may contain a photo-alignment polymer. The photo-alignment polymer is a polymer having a photo-alignment group. In a case where the photo-alignment polymer has a repeating unit having a fluorine atom or a silicon atom and represented by Formula (1) or Formula (2) which will be described later, or in a case where the photo-alignment polymer is a cleavable photo-alignment polymer, the photo-alignment polymer tends to be present at a higher density on the surface of a composition layer in a case where the composition layer is formed of the polymerizable liquid crystal composition. In the optically anisotropic layer formed by using such a composition layer, the photo-alignment polymer is present at a higher density in the vicinity of the surface. Therefore, in a case where a photo-alignment treatment is carried out, a surface shape having a predetermined alignment restricting force is formed. As a result, a desired optically anisotropic layer can be produced by further applying a polymerizable liquid crystal composition onto the optically anisotropic layer without separately providing an alignment film.

The photo-alignment group contained in the photo-alignment polymer refers to a group having a photo-alignment function in which rearrangement or an anisotropic chemical reaction is induced upon irradiation with light having anisotropy (for example, plane polarized light), and is preferably a photo-alignment group in which at least one of dimerization or isomerization occurs by the action of light, from the viewpoint that the uniformity of alignment is excellent and the thermal stability and chemical stability are also favorable.

Specific suitable examples of the group to be dimerized by the action of light include groups having a skeleton of at least one derivative selected from the group consisting of a cinnamic acid derivative, a coumarin derivative, a chalcone derivative, a maleimide derivative, and a benzophenone derivative.

On the other hand, specific suitable examples of the group to be isomerized by the action of light include groups having a skeleton of at least one compound selected from the group consisting of an azobenzene compound, a stilbene compound, a spiropyrane compound, a cinnamic acid compound, and a hydrazono-β-ketoester compound.

Among these photo-alignment groups, a group selected from the group consisting of a cinnamoyl group, an azobenzene group, a chalconyl group, and a coumarin group is preferable, from the viewpoint that the liquid crystal alignment properties of the optically anisotropic layer formed on the upper layer of the optically anisotropic layer containing the photo-alignment polymer are more favorable even with a small exposure amount.

The photo-alignment polymer is preferably a photo-alignment polymer containing a repeating unit having a photo-alignment group and a repeating unit having a fluorine atom or a silicon atom.

In addition, from the viewpoint that the liquid crystal alignment properties of the optically anisotropic layer formed on the upper layer of the optically anisotropic layer containing the photo-alignment polymer are more favorable, the photo-alignment polymer is preferably a photo-alignment polymer having a repeating unit A containing a cleavage group that decomposes by the action of at least one selected from the group consisting of light, heat, an acid, and a base to generate a polar group, in which the repeating unit A has a cleavage group in a side chain and a fluorine atom or a silicon atom on more terminal side than the cleavage group of the side chain (hereinafter, also simply referred to as "cleavable photo-alignment polymer").

Here, the "polar group" contained in the repeating unit A refers to a group having at least one or more heteroatoms, and specifically includes, for example, a hydroxyl group, a carbonyl group, a carboxyl group, an amino group, a nitro group, an ammonium group, and a cyano group. Among those groups, a hydroxyl group, a carbonyl group, or a carboxyl group is preferable.

In addition, the "cleavage group that generates a polar group" refers to a group that generates the above-mentioned polar group by cleavage, but in the present invention, a group that reacts with an oxygen molecule after radical cleavage to generate a polar group is also included.

Examples of such a cleavable photo-alignment polymer include the photo-alignment polymers described in paragraphs [0014] to [0049] of WO2018/216812A, in which the contents of these paragraphs are incorporated herein.

In a case where the photo-alignment polymer is contained in, for example, the optically anisotropic layer (C), the optically anisotropic layer (B) in which a liquid crystal compound is aligned can be formed by applying a polymerizable liquid crystal composition for forming the optically anisotropic layer (B) onto the optically anisotropic layer (C) without separately applying an alignment film. That is, the optically anisotropic layer (C) and the optically anisotropic layer (A) or (B) can be directly laminated.

Other suitable examples of the photo-alignment polymer containing a repeating unit having a fluorine atom or a silicon atom include a copolymer having a repeating unit having a fluorine atom or a silicon atom and represented by Formula (1) or Formula (2) and a repeating unit having a photo-alignment group (hereinafter, also simply referred to as "specific copolymer").

The repeating unit having a fluorine atom or a silicon atom and represented by Formula (1) or Formula (2) is a repeating unit containing a cleavage group that decomposes by the action of at least one selected from the group consisting of light, heat, an acid, and a base to generate a polar group.

In Formula (1) and Formula (2), r and s each independently represent an integer of 1 or more.

In addition, $R^{B1}$ and $R^{B2}$ each independently represent a hydrogen atom or a substituent.

In addition, $Y^1$ and $Y^2$ each independently represent —O— or —$NR^Z$—. In this regard, $R^Z$ represents a hydrogen atom or a substituent.

In addition, $L^{B1}$ represents an r+1-valent linking group.

In addition, $L^{B2}$ represents an s+1-valent linking group.

In addition, B1 represents a group represented by Formula (B1). In this regard, in a case where * in Formula (B1) represents a bonding position with $L^{B1}$ and r is an integer of 2 or more, the plurality of B1's may be the same as or different from each other.

In addition, B2 represents a group represented by Formula (B2). In this regard, in a case where * in Formula (B2) represents a bonding position with $L^{B2}$ and s is an integer of 2 or more, the plurality of B2's may be the same as or different from each other.

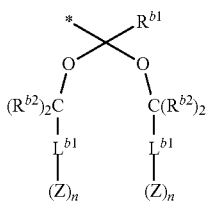
(B1)

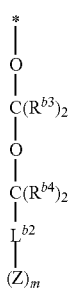
(B2)

In Formula (B1) and Formula (B2), * represents a bonding position.

In addition, n represents an integer of 1 or more. In this regard, the plurality of n's may be the same as or different from each other.

In addition, m represents an integer of 2 or more.

In addition, $R^{b1}$ represents a hydrogen atom or a substituent.

In addition, $R^{b2}$, $R^{b3}$, and $R^{b4}$ each independently represent a hydrogen atom or a substituent. In this regard, the two $R^{b3}$'s may be bonded to each other to form a ring, the plurality of $R^{b2}$'s may be the same as or different from each other, the plurality of $R^{b3}$'s may be the same as or different from each other, and the plurality of $R^{b4}$'s may be the same as or different from each other.

In addition, $L^{b1}$ represents an n+1-valent linking group. In this regard, the plurality of $L^{b1}$'s may be the same as or different from each other.

In addition, $L^{b2}$ represents an m+1-valent linking group.

In addition, Z represents an aliphatic hydrocarbon group having a fluorine atom or an organosiloxane group. In this regard, the aliphatic hydrocarbon group may have an oxygen atom, and a plurality of Z's may be the same as or different from each other.

Examples of the substituent represented by $R^{B1}$ in Formula (1) include known substituents. Above all, the substituent represented by $R^{B1}$ is preferably an alkyl group having 1 to 12 carbon atoms and more preferably a methyl group.

In Formula (1), $Y^1$ represents —O— or —$NR^Z$— where $R^Z$ represents a hydrogen atom or a substituent. Examples of the substituent represented by $R^Z$ include known substituents, among which a methyl group is preferable. $Y^1$ preferably represents —O— or —NH— and more preferably represents —O—.

In Formula (1), $L^{B1}$ represents an r+l-valent linking group. The r+l-valent linking group is an r+l-valent hydrocarbon group having 1 to 24 carbon atoms which may have a substituent, preferably a hydrocarbon group in which some of the carbon atoms constituting the hydrocarbon group may be substituted with heteroatoms, and more preferably an aliphatic hydrocarbon group having 1 to 10 carbon atoms which may contain an oxygen atom or a nitrogen atom. The r+1-valent linking group is preferably a divalent to trivalent linking group and more preferably a divalent linking group.

In Formula (1), r represents an integer of 1 or more. Above all, from the viewpoint of synthetic suitability, r is preferably an integer of 1 to 3, more preferably an integer of 1 to 2, and still more preferably 1.

Examples of the substituent represented by $R^{B2}$ in Formula (2) include known substituents. Above all, the substituent represented by $R^{B2}$ is preferably an alkyl group having 1 to 12 carbon atoms and more preferably a methyl group.

In Formula (2), $Y^2$ represents —O— or —$NR^Z$—. In this regard, $R^Z$ represents a hydrogen atom or a substituent. Examples of the substituent represented by $R^Z$ include known substituents, among which a methyl group is preferable. $Y^2$ preferably represents —O— or —NH— and more preferably represents —O—.

In Formula (2), $L^{B2}$ represents an s+1-valent linking group. The s+1-valent linking group is an s+1-valent hydrocarbon group having 1 to 24 carbon atoms which may have a substituent, preferably a hydrocarbon group in which some of the carbon atoms constituting the hydrocarbon group may be substituted with heteroatoms, and more preferably an aliphatic hydrocarbon group having 1 to 10 carbon atoms which may contain an oxygen atom or a nitrogen atom.

The s+1-valent linking group is preferably a divalent linking group.

In Formula (2), s represents an integer of 1 or more. Above all, from the viewpoint of synthetic suitability, s is preferably an integer of 1 to 2 and more preferably 1.

In Formula (B1), the substituent represented by $R^{b1}$ is preferably an aliphatic hydrocarbon group having 1 to 18 carbon atoms, more preferably an alkyl group having 1 to 12 carbon atoms, and still more preferably a methyl group. $R^{b1}$ is preferably a substituent.

Examples of the substituent represented by $R^{b2}$ in Formula (B1) include known substituents, including the groups exemplified for the substituent represented by $R^{b1}$ in Formula (B1). In addition, $R^{b2}$ preferably represents a hydrogen atom.

In Formula (B1), $L^{b1}$ represents an n+l-valent linking group, and the n+l-valent linking group is an n+l-valent hydrocarbon group having 1 to 24 carbon atoms which may have a substituent, preferably a hydrocarbon group in which some of the carbon atoms constituting the hydrocarbon group may be substituted with heteroatoms, and more preferably an aliphatic hydrocarbon group having 1 to 10 carbon atoms which may contain an oxygen atom or a nitrogen atom.

The n+1-valent linking group is preferably a divalent to tetravalent linking group, more preferably a divalent to trivalent linking group, and still more preferably a divalent linking group.

In Formula (B1), n represents an integer of 1 or more. Above all, from the viewpoint of synthetic suitability, n is preferably an integer of 1 to 5, more preferably an integer of 1 to 3, and still more preferably 1.

In Formula (B1) and Formula (B2), Z represents an aliphatic hydrocarbon group having a fluorine atom or an organosiloxane group. In this regard, the aliphatic hydrocarbon group may have an oxygen atom, and a plurality of Z's may be the same as or different from each other.

Examples of the aliphatic hydrocarbon group having a fluorine atom include a fluorine atom-containing alkyl group, a group in which one or more of —$CH_2$— constituting a fluorine atom-containing alkyl group are substituted with —O—, and a fluorine atom-containing alkenyl group.

The number of carbon atoms in the aliphatic hydrocarbon group having a fluorine atom is not particularly limited and is preferably 1 to 30, more preferably 3 to 20, and still more preferably 3 to 10.

The number of fluorine atoms contained in the aliphatic hydrocarbon group having a fluorine atom is not particularly limited and is preferably 1 to 30, more preferably 5 to 25, and still more preferably 7 to 20.

Examples of the substituent represented by $R^{b3}$ and $R^{b4}$ in Formula (B2) include known substituents, including the groups exemplified for the substituent represented by $R^{b1}$ in Formula (B1). In addition, with regard to $R^{b3}$, it is preferable that two Rb's are bonded to each other to form a ring, and it is more preferable that two Rb's are bonded to each other to form a cyclohexane ring. In addition, $R^{b4}$ preferably represents a hydrogen atom.

In Formula (B2), $L^{b2}$ represents an m+l-valent linking group.

The m+1-valent linking group is an m+1-valent hydrocarbon group having 1 to 24 carbon atoms which may have a substituent, preferably a hydrocarbon group in which some of the carbon atoms constituting the hydrocarbon group may be substituted with heteroatoms, and more preferably an aliphatic hydrocarbon group having 1 to 10 carbon atoms which may contain an oxygen atom or a nitrogen atom. The m+1-valent linking group is preferably a trivalent to tetravalent linking group and more preferably a tetravalent linking group.

In Formula (B2), m represents an integer of 2 or more. Above all, from the viewpoint of synthetic suitability, m is preferably an integer of 2 to 4 and more preferably an integer of 2 to 3.

Specific examples of the repeating unit containing the group represented by Formula (B1) include repeating units represented by Formula B-1 to Formula B-22, and specific examples of the repeating unit containing the group represented by Formula (B2) include repeating units represented by Formula B-23 and Formula B-24.

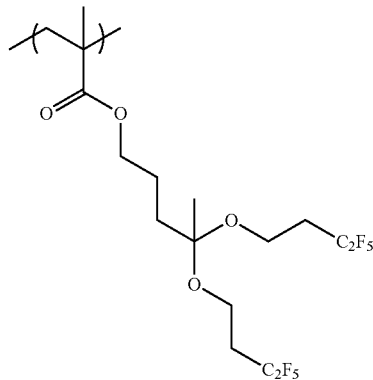

B-2

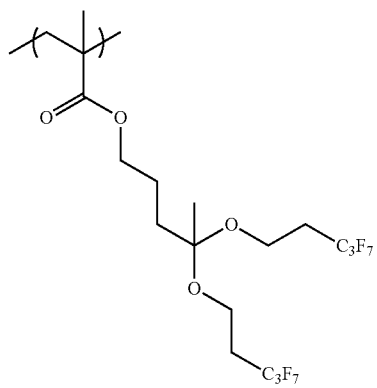

B-3

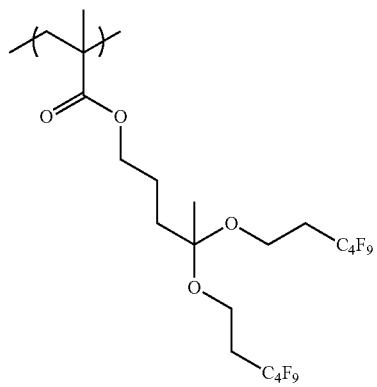

B-4

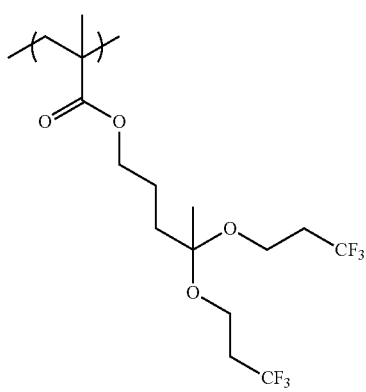

B-1

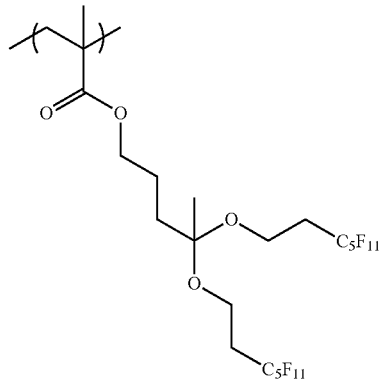

B-5

B-6
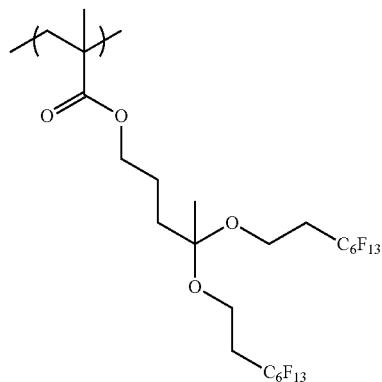
B-7
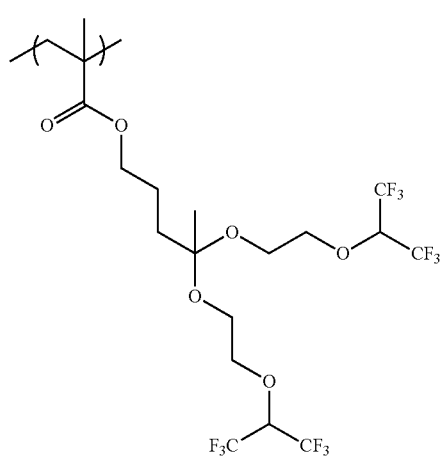
B-8
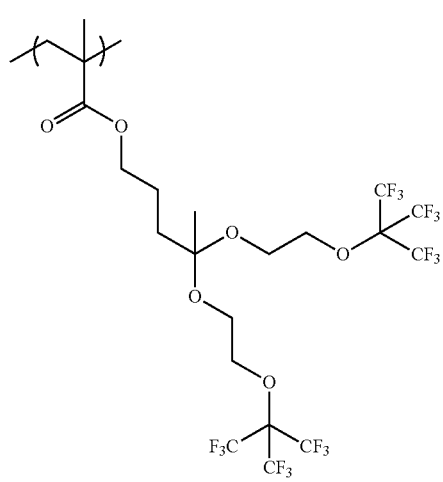
B-9
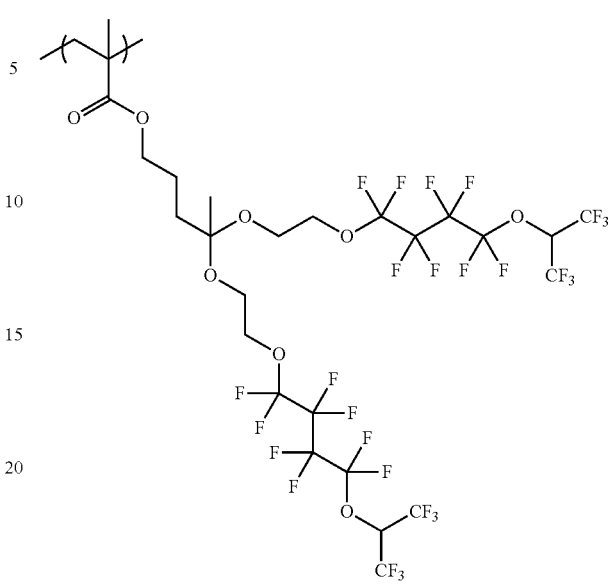
B-10
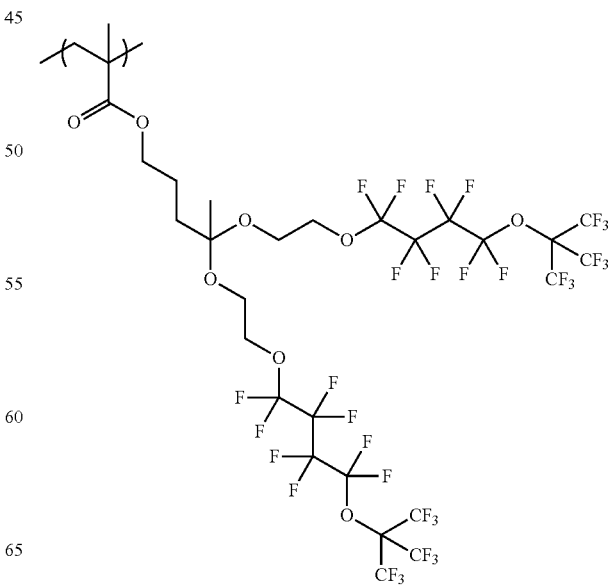

-continued

B-11

B-12

B-13

B-14

B-15

B-16

B-17

B-18
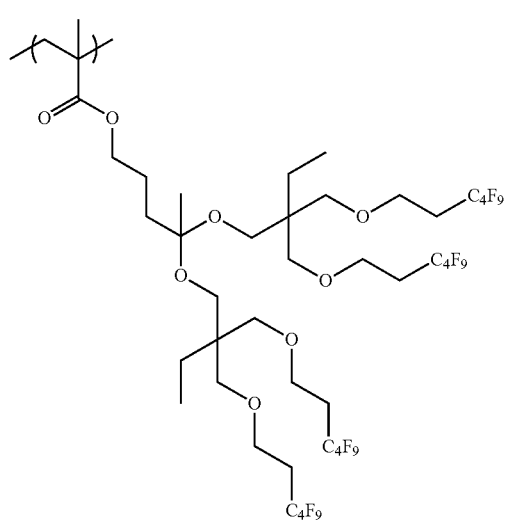
B-19
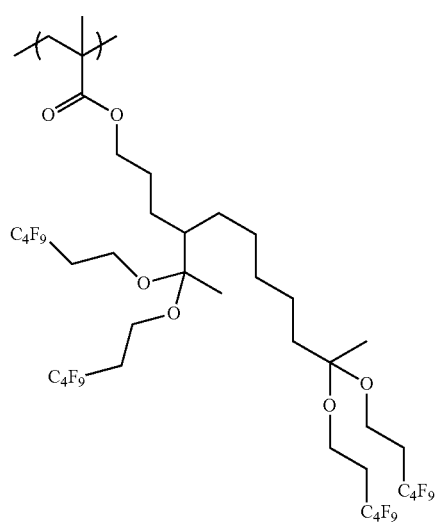
B-20
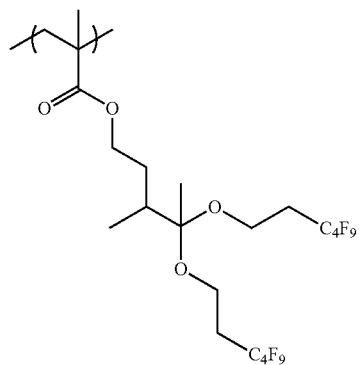
B-21
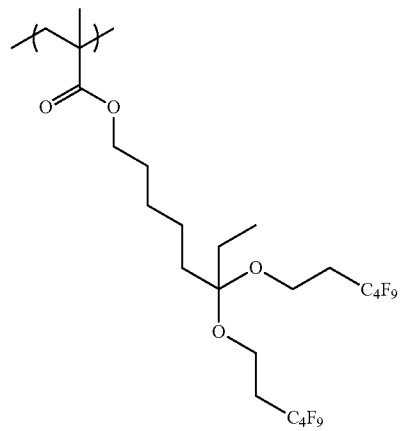
B-22
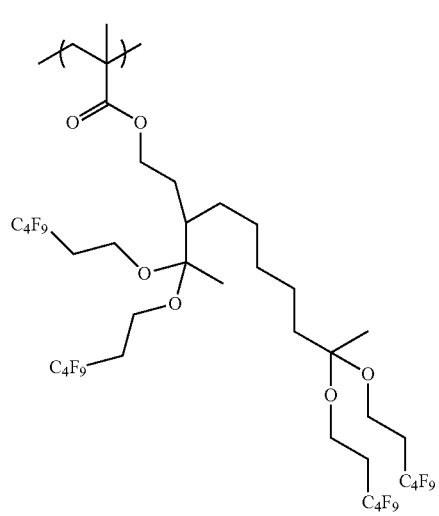
B-23
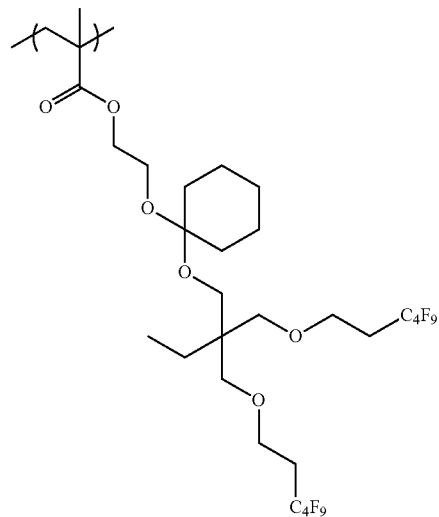

B-24

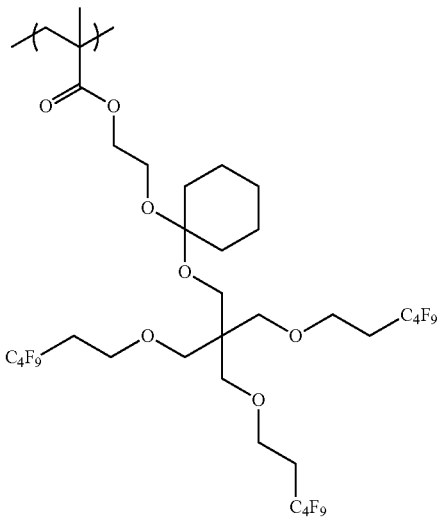

A-2

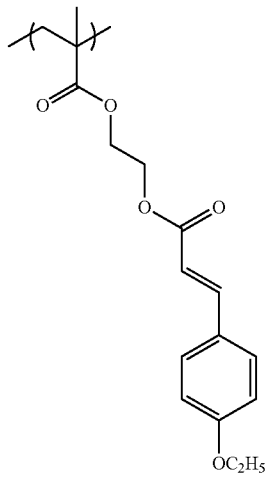

The content of the repeating unit having a fluorine atom or a silicon atom and represented by Formula (1) or Formula (2) in the photo-alignment polymer is not particularly limited. From the viewpoint that the effect of suppressing wind unevenness is improved, the content of the repeating unit having a fluorine atom or a silicon atom and represented by Formula (1) or Formula (2) is preferably 15% to 75% by mass, more preferably 20% to 50% by mass, and still more preferably 25% to 45% by mass with respect to all the repeating units of the photo-alignment polymer.

The structure of the main chain of the repeating unit having a photo-alignment group is not particularly limited, and may be, for example, a known structure, which is preferably, for example, a skeleton selected from the group consisting of a (meth)acrylic skeleton, a styrene-based skeleton, a siloxane-based skeleton, a cycloolefin-based skeleton, a methylpentene-based skeleton, an amide-based skeleton, and an aromatic ester-based skeleton.

Among these skeletons, a skeleton selected from the group consisting of a (meth)acrylic skeleton, a siloxane-based skeleton, and a cycloolefin-based skeleton is more preferable, and a (meth)acrylic skeleton is still more preferable.

Specific examples of the repeating unit having a photo-alignment group include the following.

A-3

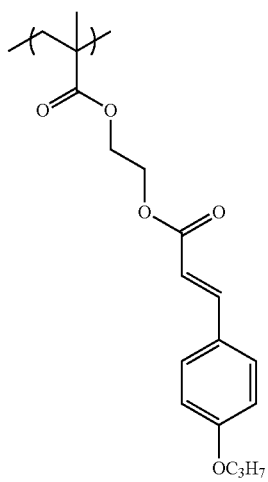

A-1

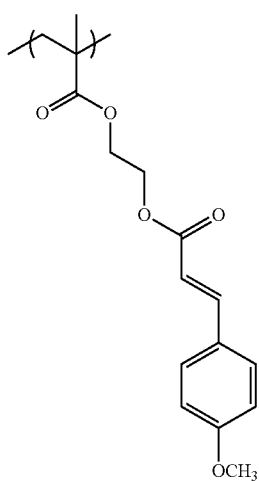

A-4

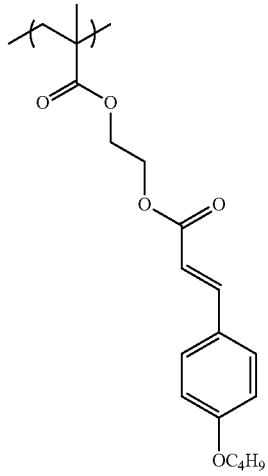

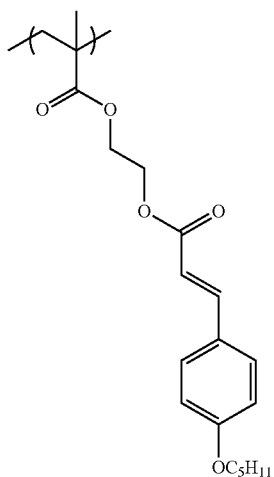
A-5
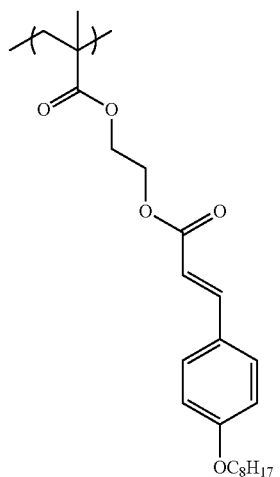
A-8
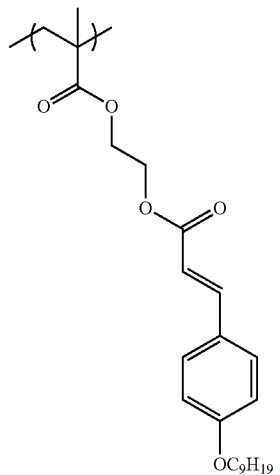
A-9
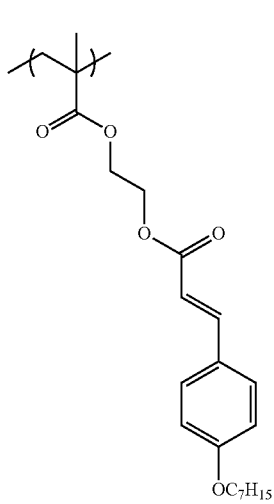
A-7
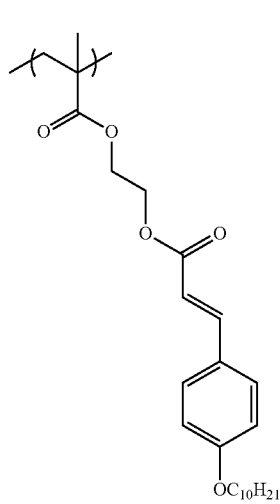
A-10

A-11
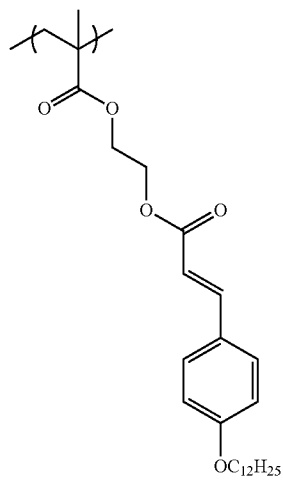
A-14
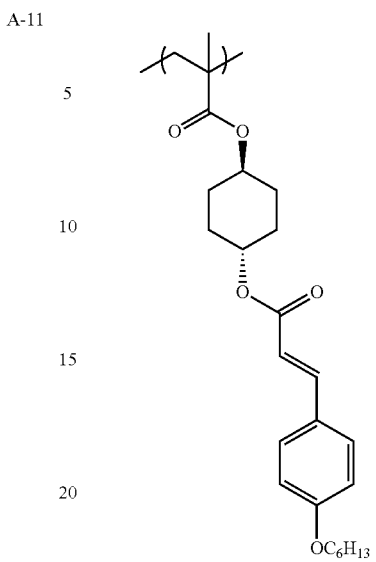
A-12
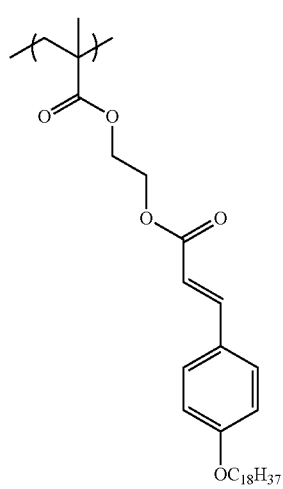
A-15
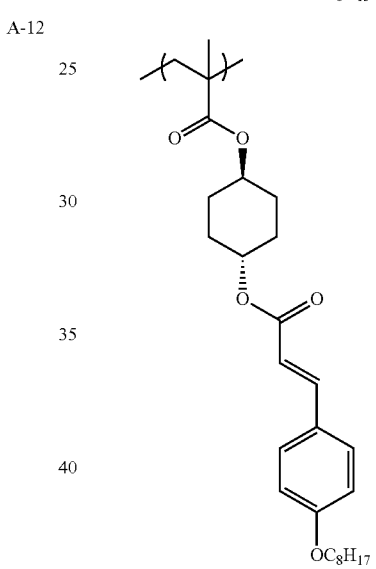
A-13
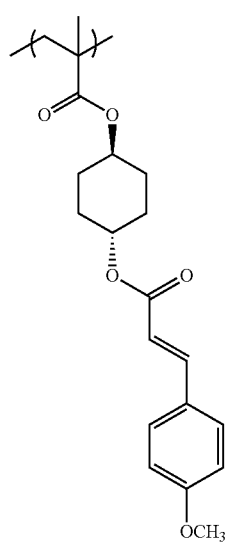
A-16
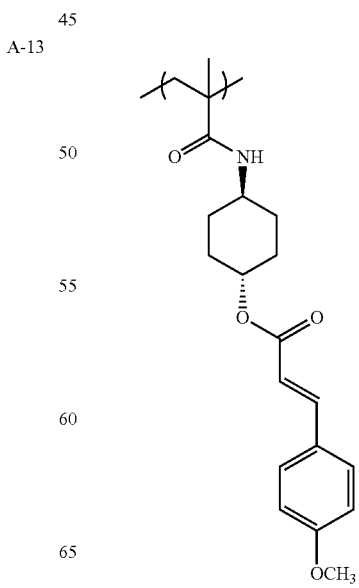

A-17
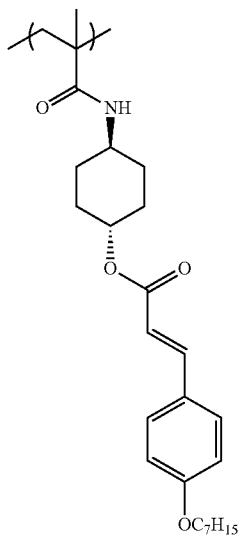
A-18
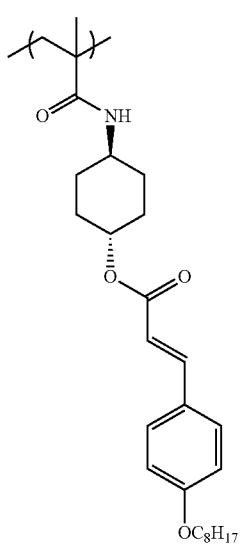
A-19
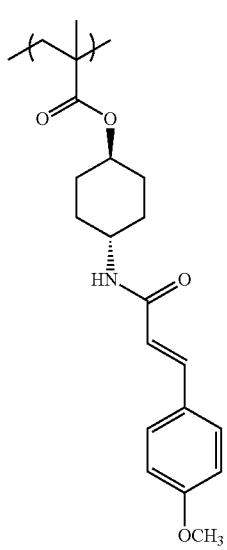
A-20
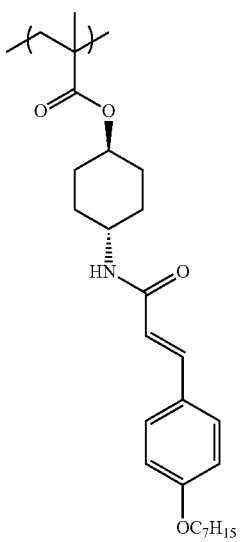
A-21
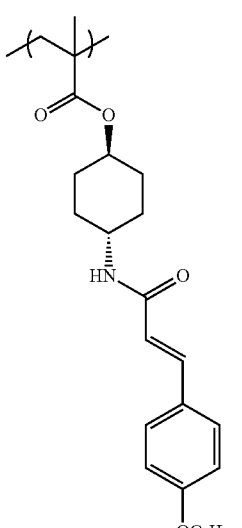
A-22
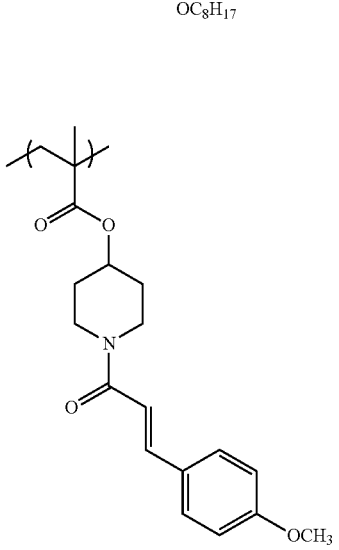

A-23
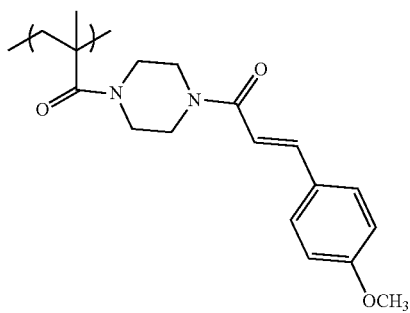
A-24
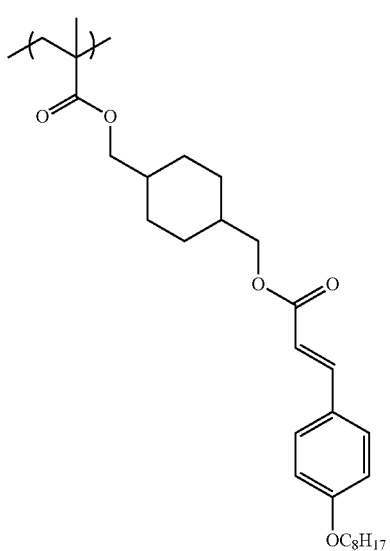
A-25
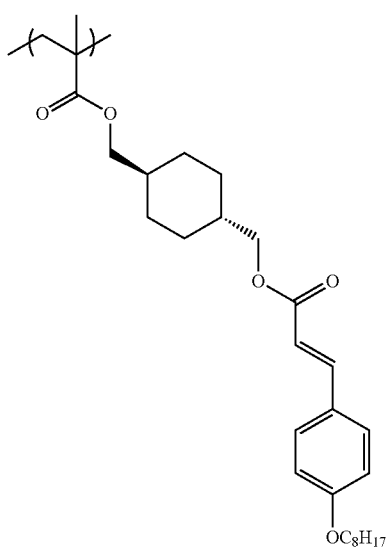
A-26
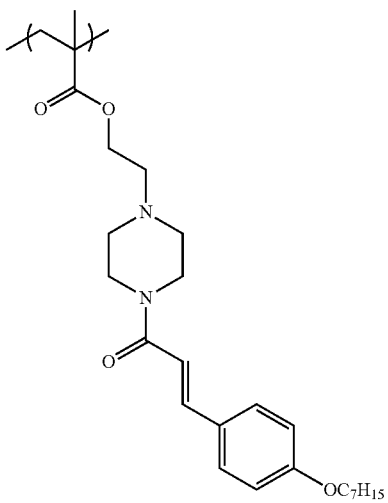
A-27
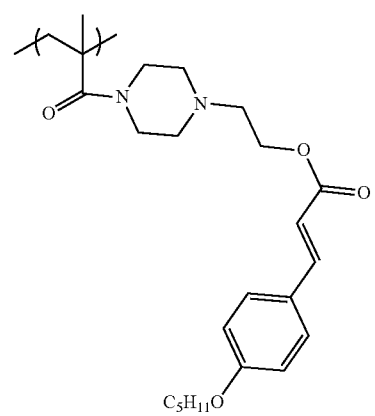
A-28
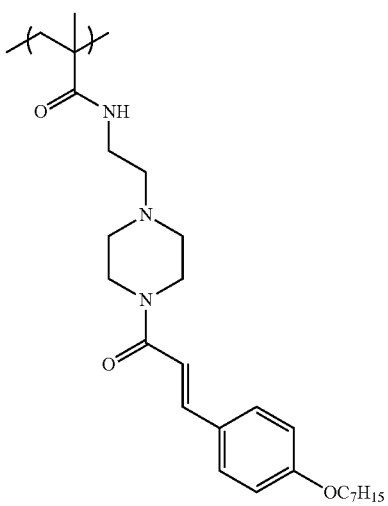

A-29

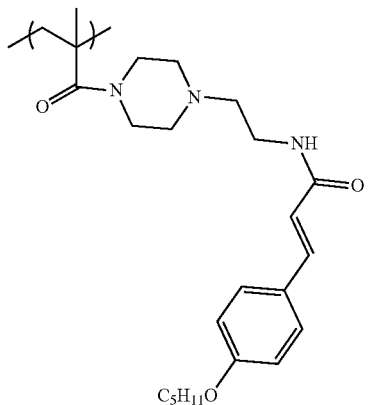

The content of the repeating unit having a photo-alignment group in the photo-alignment polymer is not particularly limited. From the viewpoint that the liquid crystal alignment properties of the optically anisotropic layer formed on the upper layer are more favorable, the content of the repeating unit having a photo-alignment group is preferably 5% to 60% by mass, more preferably 10% to 50% by mass, and still more preferably 15% to 40% by mass with respect to all the repeating units of the photo-alignment polymer.

The specific copolymer may further have a repeating unit having a crosslinkable group, in addition to the repeating unit having a fluorine atom or a silicon atom and represented by Formula (1) or Formula (2) and the repeating unit having a photo-alignment group.

The type of the crosslinkable group is not particularly limited, and may be, for example, a known crosslinkable group. Among them are an epoxy group, an epoxycyclohexyl group, an oxetanyl group, an acryloyl group, a methacryloyl group, a vinyl group, a styryl group, and an allyl group.

The structure of the main chain of the repeating unit having a crosslinkable group is not particularly limited, and may be, for example, a known structure, which is preferably, for example, a skeleton selected from the group consisting of a (meth)acrylic skeleton, a styrene-based skeleton, a siloxane-based skeleton, a cycloolefin-based skeleton, a methylpentene-based skeleton, an amide-based skeleton, and an aromatic ester-based skeleton.

Among these skeletons, a skeleton selected from the group consisting of a (meth)acrylic skeleton, a siloxane-based skeleton, and a cycloolefin-based skeleton is more preferable, and a (meth)acrylic skeleton is still more preferable.

Specific examples of the repeating unit having a crosslinkable group include the following.

C-1

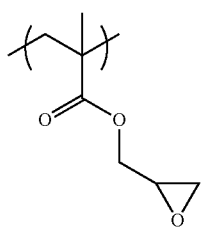

C-2

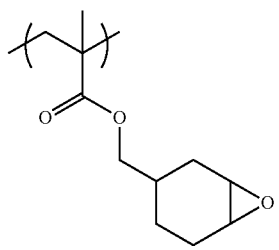

C-3

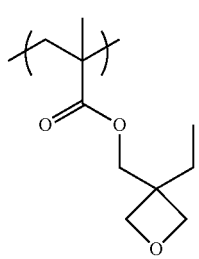

C-4

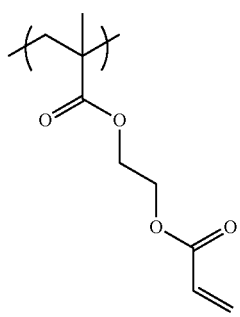

C-5

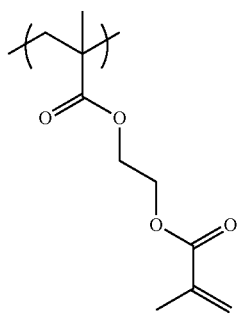

C-6

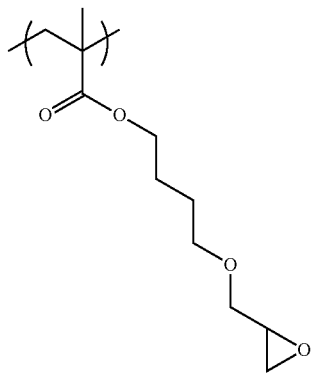

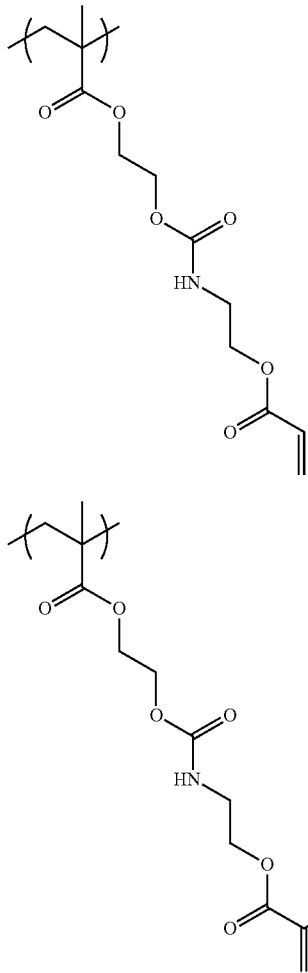

The content of the repeating unit having a crosslinkable group in the specific copolymer is not particularly limited, and is preferably 10% to 60% by mass and more preferably 20% to 50% by mass with respect to all the repeating units of the photo-alignment polymer, from the viewpoint that the liquid crystal alignment properties of the optically anisotropic layer formed on the upper layer are more favorable.

Examples of the monomer (radical polymerizable monomer) forming a repeating unit other than the foregoing repeating units include an acrylic acid ester compound, a methacrylic acid ester compound, a maleimide compound, an acrylamide compound, acrylonitrile, maleic acid anhydride, a styrene compound, and a vinyl compound.

The method for synthesizing the photo-alignment polymer is not particularly limited. For example, the photo-alignment polymer can be synthesized by mixing a monomer forming the above-mentioned repeating unit having a fluorine atom or a silicon atom and represented by Formula (1) or Formula (2), a monomer forming the above-mentioned repeating unit having a photo-alignment group, and a monomer forming any other repeating unit, and polymerizing the mixed monomers in an organic solvent using a radical polymerization initiator.

The weight-average molecular weight (Mw) of the photo-alignment polymer is not particularly limited, and is preferably 25,000 or more, more preferably 25,000 to 500,000, still more preferably 25,000 to 300,000, and particularly preferably 30,000 to 150,000 from the viewpoint that the liquid crystal alignment properties of the optically anisotropic layer formed on the upper layer are more favorable.

Here, the weight-average molecular weights of the photo-alignment polymer and a surfactant are values measured by gel permeation chromatography (GPC) under the following conditions.

Solvent (eluent): tetrahydrofuran (THF)
Device name: TOSOH HLC-8320GPC
Column: three TOSOH TSKgel Super HZM-H (4.6 mm×15 cm) connected in series
Column temperature: 40° C.
Sample concentration: 0.1% by mass
Flow rate: 1.0 ml/min
Calibration curve: calibration curve for 7 samples of TSK standard polystyrene, manufactured by Tosoh Corporation, Mw=2,800,000 to 1,050 (Mw/Mn=1.03 to 1.06)

<<Organic EL Display Device>>

The organic EL display device according to the embodiment of the present invention has the above-mentioned circularly polarizing plate. Usually, the circularly polarizing plate is provided on an organic EL display panel of the organic EL display device. That is, the organic EL display device according to the embodiment of the present invention has an organic EL display panel and the above-mentioned circularly polarizing plate.

An example of the organic EL display device has an organic EL display panel, a phase difference film, and a polarizer in this order.

The organic EL display panel is a member in which a light emitting layer or a plurality of organic compound thin films including a light emitting layer are formed between a pair of electrodes of an anode and a cathode, and may have a hole injection layer, a hole transport layer, an electron injection layer, an electron transport layer, a protective layer, and the like in which each of these layers may have other functions, in addition to the light emitting layer. Various materials can be used to form each layer.

<<Display Device>>

The above-mentioned circularly polarizing plate can also be used in a variety of display devices having a curved surface. For example, the above-mentioned circularly polarizing plate can be used for a rollable display, an in-vehicle display, a lens of sunglasses, a lens of goggles for an image display apparatus, and the like, each of which has a curved surface.

The circularly polarizing plate according to the embodiment of the present invention can be bonded onto a curved surface or integrally molded with a resin, which contributes to an improvement in design. The organic EL display device using the circularly polarizing plate according to the embodiment of the present invention is preferably used for a curved screen display or an in-vehicle display because tint unevenness in an oblique direction can be suppressed.

The organic EL display device using the circularly polarizing plate according to the embodiment of the present invention is also preferably used in in-vehicle display optical systems such as a head-up display, optical systems such as AR glasses and VR glasses, optical sensors such as a LiDAR, a face recognition system, and polarization imaging, and the like. In addition, it is also preferable that the circularly polarizing plate according to the embodiment of the present invention is disposed along a curved surface for use in a display device having a curved surface.

EXAMPLES

Hereinafter, features of the present invention will be described in more detail with reference to Examples and Comparative Examples. The materials, amounts used, proportions, treatment details, and treatment procedure shown in the following Examples can be appropriately changed without departing from the spirit and scope of the present invention. Therefore, the scope of the present invention should not be construed as being limited by the specific examples given below.

Example 1

(Preparation of Cellulose Acylate Film (Substrate))

The following composition was put into a mixing tank, stirred, and further heated at 90° C. for 10 minutes. Then, the obtained composition was filtered through a filter paper having an average pore diameter of 34 μm and a sintered metal filter having an average pore diameter of 10 μm to prepare a dope. The concentration of solid contents of the dope is 23.5% by mass, the amount of the plasticizer added is a proportion relative to cellulose acylate, and the solvent of the dope is methylene chloride/methanol/butanol=81/18/1 (in terms of a mass ratio).

| Cellulose acylate dope | |
| --- | --- |
| Cellulose acylate (acetyl substitution degree: 2.86, viscosity average polymerization degree: 310) | 100 parts by mass |
| Sugar ester compound 1 (represented by Chemical Formula (S4)) | 6.0 parts by mass |
| Sugar ester compound 2 (represented by Chemical Formula (S5)) | 2.0 parts by mass |
| Silica particle dispersion (AEROSIL R972, manufactured by Nippon Aerosil Co., Ltd.) | 0.1 parts by mass |

Solvent (methylene chloride/methanol/butanol)

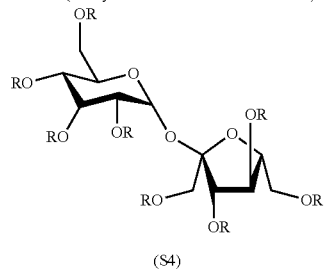

(S4)
R = benzoyl or H
Average substitution degree: 5.7

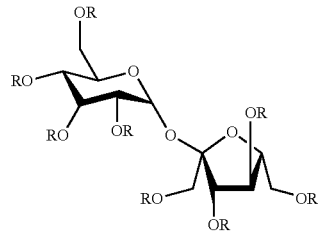

(S5)
R = acetyl/isobutyryl = 2/6

The dope prepared above was cast using a drum film forming machine. The dope was cast from a die such that it was in contact with a metal support cooled to 0° C., and then the obtained web (film) was stripped off from the drum. The drum was made of SUS.

The web (film) obtained by casting was peeled off from the drum and then dried in a tenter device for 20 minutes at 30° C. to 40° C. during film transport, using the tenter device that clips both ends of the web with clips to transport the film. Subsequently, the web was post-dried by zone heating while being rolled and transported. The obtained web was knurled and then wound up.

The obtained cellulose acylate film had a film thickness of 40 μm, an in-plane retardation Re(550) of 1 nm at a wavelength of 550 nm, and a thickness direction retardation Rth(550) of 26 nm at a wavelength of 550 nm.

(Alkali Saponification Treatment)

After passing the above-mentioned cellulose acylate film through a dielectric heating roll at a temperature of 60° C. to raise the film surface temperature to 40° C., an alkaline solution having the composition shown below was applied onto a band surface of the film using a bar coater at a coating amount of 14 ml/m$^2$, followed by heating to 110° C., and transportation under a steam type far-infrared heater manufactured by Noritake Co., Limited for 10 seconds. Subsequently, pure water was applied at 3 ml/m$^2$ using the same bar coater. Then, after repeating washing with water with a fountain coater and draining with an air knife three times, the film was transported to a drying zone at 70° C. for 10 seconds and dried to prepare a cellulose acylate film subjected to an alkali saponification treatment.

| Alkaline solution | |
| --- | --- |
| Potassium hydroxide | 4.7 parts by mass |
| Water | 15.8 parts by mass |
| Isopropanol | 63.7 parts by mass |
| Surfactant: $C_{14}H_{29}O(CH_2CH_2O)_{20}H$ | 1.0 parts by mass |
| Propylene glycol | 14.8 parts by mass |

(Formation of Alignment Film)

An alignment film coating liquid having the following composition was continuously applied onto the surface of the cellulose acylate film that had been subjected to the alkali saponification treatment with a #14 wire bar. The film was dried with hot air at 60° C. for 60 seconds and further with hot air at 100° C. for 120 seconds.

| Alignment film coating liquid | |
| --- | --- |
| Polyvinyl alcohol given below | 10 parts by mass |
| Water | 371 parts by mass |
| Methanol | 119 parts by mass |
| Glutaraldehyde (crosslinking agent) | 0.5 parts by mass |
| Citric acid ester (manufactured by Sankyo Chemical Co., Ltd.) | 0.175 parts by mass |

(Polyvinyl alcohol)

$$-(CH_2-CH)_{88}-(CH_2-CH)_{12}-$$
$$\quad\quad\ \ |\quad\quad\quad\quad\ |$$
$$\quad\quad OH\quad\quad\quad\ O\!\!-\!\!C(=O)CH_3$$

(Formation of Optically Anisotropic Layer (A))

The above prepared alignment film was continuously subjected to a rubbing treatment. At this time, the longitudinal direction and the transport direction of the elongated film were parallel, and the angle between the film longitudinal direction (transport direction) and the rubbing roller rotation axis was 76°. In a case where the film longitudinal direction (transport direction) is 90° and the clockwise direction is represented by a positive value with reference to a film width direction as a reference (0°) in a case of being observed from the film side, the rotation axis of the rubbing roller is at −14°. In other words, the position of the rotation axis of the rubbing roller is a position rotated by 76° clockwise with reference to the longitudinal direction of the film, upon being observed from the film side.

A composition (1a) for forming an optically anisotropic layer containing a disk-like liquid crystal compound having the following composition was applied onto the rubbing-treated alignment film using a geeser coating machine to form a composition layer. Then, the obtained composition layer was heated with hot air at 110° C. for 2 minutes for drying of the solvent and alignment aging of the disk-like liquid crystal compound. Subsequently, the obtained composition layer was irradiated with UV (500 mJ/cm$^2$) at 80° C. to immobilize the alignment of the liquid crystal compound to form an optically anisotropic layer (1a) corresponding to the optically anisotropic layer (A).

The optically anisotropic layer (1a) had a thickness of 1.1 In addition, the in-plane retardation at a wavelength of 550 nm was 168 nm. It was confirmed that the average tilt angle of the disc plane of the disk-like liquid crystal compound with respect to the film surface was 90°, and the disk-like liquid crystal compound was aligned vertically to the film surface. In addition, assuming that the angle of the in-plane slow axis of the optically anisotropic layer (1a) is parallel to the rotation axis of the rubbing roller, and the width direction of the film is defined as 0° (the counterclockwise direction is defined as 90° and the clockwise direction is defined as −90° in a longitudinal direction), the in-plane slow axis was −14° in a case of viewing from the optically anisotropic layer (1a) side.

The a and b represent the content (% by mass) of each repeating unit with respect to all the repeating units, a represents 90% by mass, and b represents 10% by mass.

Fluorine-containing compound B (The numerical value in each repeating unit represents the content (% by mass) with respect to all the repeating units, the content of the repeating unit on the left side was 32.5% by mass, and the content of the repeating unit on the right side was 67.5% by mass.)

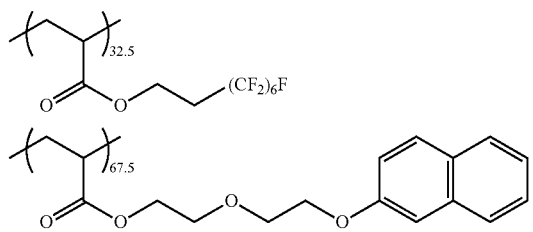

Fluorine-containing compound C (The numerical value in each repeating unit represents the content (% by mass) with respect to all the repeating units, the content of the repeating unit on the left side was 25% by mass, the content of the repeating unit in the middle was 25% by mass, and the content of the repeating unit on the right side was 50% by mass)

| Composition (1a) for forming optically anisotropic layer | |
|---|---|
| Disk-like liquid crystal compound 1 given below | 80 parts by mass |
| Disk-like liquid crystal compound 2 given below | 20 parts by mass |
| Alignment film interface alignment agent 1 given below | 0.55 parts by mass |
| Fluorine-containing compound A given below | 0.1 parts by mass |
| Fluorine-containing compound B given below | 0.05 parts by mass |
| Fluorine-containing compound C given below | 0.21 parts by mass |
| Ethylene oxide-modified trimethylolpropane triacrylate (V# 360, manufactured by Osaka Organic Chemical Industry Ltd.) | 10 parts by mass |
| Photopolymerization initiator (IRGACURE 907, manufactured by BASF SE) | 3.0 parts by mass |
| Methyl ethyl ketone | 200 parts by mass |

Disk-like liquid crystal compound 1

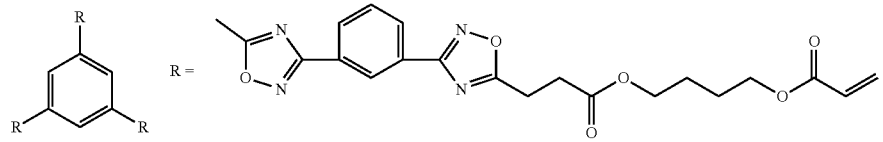

Disk-like liquid crystal compound 2

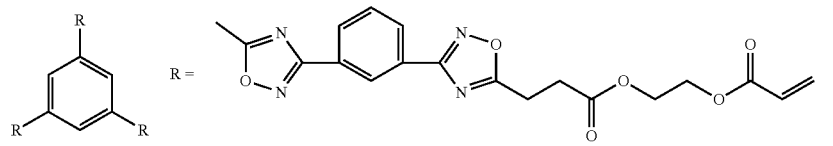

Alignment film interface alignment agent 1

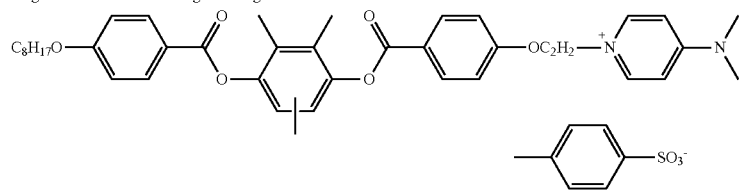

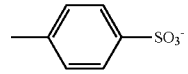

Fluorine-containing compound A

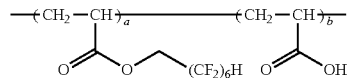

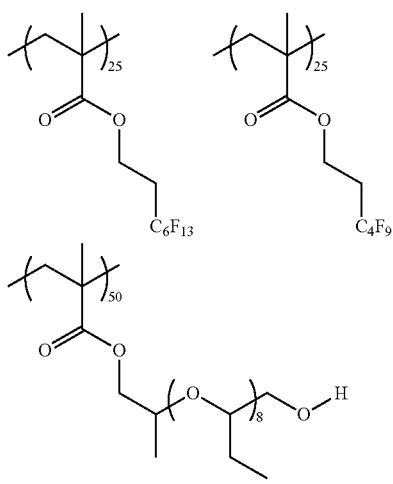

(Formation of Laminate of Optically Anisotropic Layer (C) and Optically Anisotropic Layer (B))

(Formation of Optically Anisotropic Layer (1c))

A composition (1c) for forming an optically anisotropic layer containing a rod-like liquid crystal compound having the following composition was applied onto the above prepared cellulose acylate film using a geeser coating machine to form a composition layer. After that, both ends of the film were held, a cooling plate (9° C.) was installed on the side of the surface on which the composition layer of the film was formed so that the distance from the film was 5 mm, and a heater (75° C.) was installed on the side opposite to the surface on which the composition layer of the film was formed so that the distance from the film was 5 mm, followed by drying for 2 minutes.

Next, the film was heated with hot air at 60° C. for 1 minute, and irradiated with ultraviolet rays at an irradiation amount of 100 mJ/cm$^2$ using a 365 nm UV-LED while purging with nitrogen so as to have an atmosphere having an oxygen concentration of 100 ppm or less. This was followed by annealing with hot air at 120° C. for 1 minute to form an optically anisotropic layer (1c).

The obtained optically anisotropic layer (1c) was irradiated with UV light (ultra-high pressure mercury lamp; UL750, manufactured by HOYA Corporation) passing through a wire grid polarizer at room temperature at an irradiation amount of 7.9 mJ/cm$^2$ (wavelength: 313 nm) to form a optically anisotropic layer (1c) having an alignment control ability on the surface.

The film thickness of the formed optically anisotropic layer (1c) was 0.5 The formed composition layer had an in-plane retardation Re of 0 nm at a wavelength of 550 nm and a thickness direction retardation Rth of −68 nm at a wavelength of 550 nm. It was confirmed that the average tilt angle of the major axis direction of the rod-like liquid crystal compound with respect to the film surface was 90° and the rod-like liquid crystal compound was aligned vertically to the film surface.

In this manner, an optically anisotropic layer (1c) corresponding to the optically anisotropic layer (C) was formed.

| Composition (1c) for forming optically anisotropic layer | |
|---|---|
| Rod-like liquid crystal compound (A) given below | 100 parts by mass |
| Polymerizable monomer (A-400, manufactured by Shin-Nakamura Chemical Co., Ltd.) | 4.0 parts by mass |
| Polymerization initiator S-1 (oxime type) given below | 5.0 parts by mass |
| Photoacid generator D-1 given below | 3.0 parts by mass |
| Polymer M-1 given below | 2.0 parts by mass |
| Vertical alignment agent S01 given below | 2.0 parts by mass |
| Photo-alignment polymer A-1 given below | 2.0 parts by mass |
| Surfactant B-1 given below | 0.2 parts by mass |
| Methyl ethyl ketone | 42.3 parts by mass |
| Methyl isobutyl ketone | 627.5 parts by mass |

Rod-like liquid crystal compound (A) (hereinafter, a mixture of compounds)

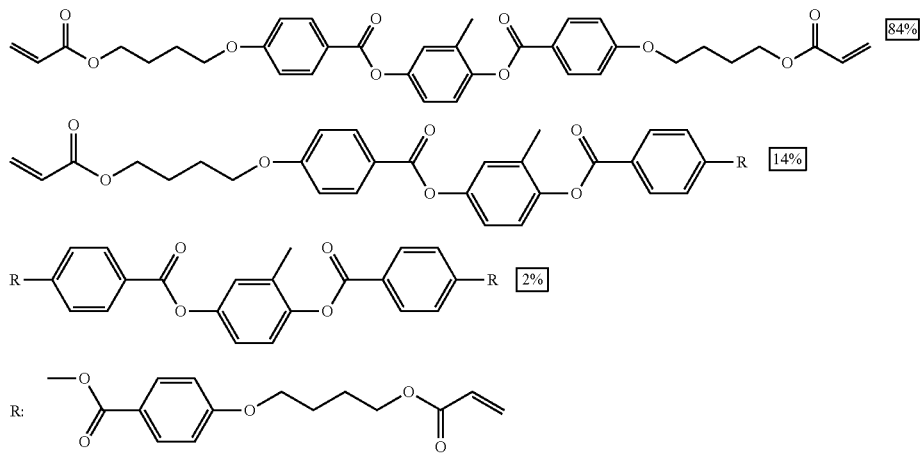

| Composition (1c) for forming optically anisotropic layer |
|---|

Polymerization initiator S-1

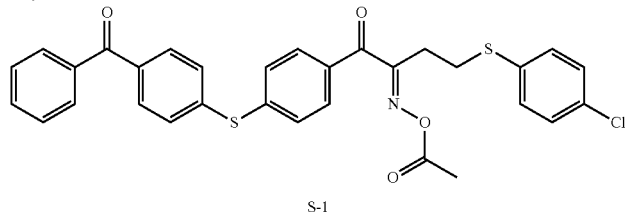

S-1

Photoacid generator D-1

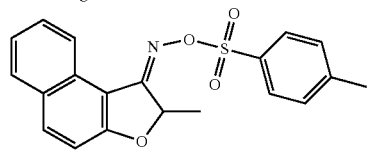

Polymer M-1

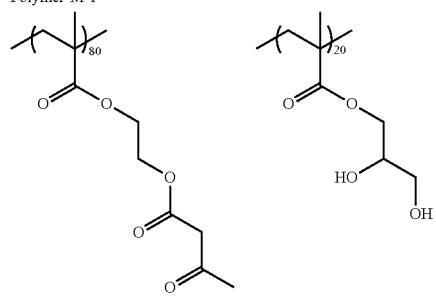

Vertical alignment agent S01

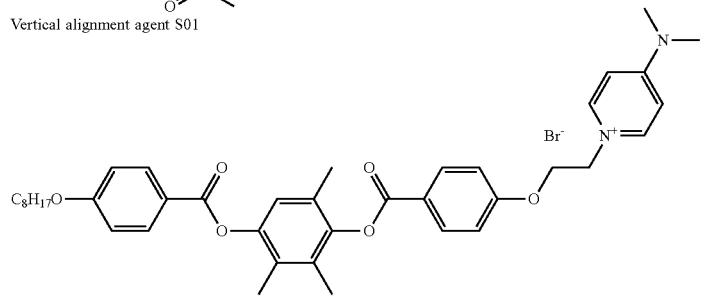

Photo-alignment polymer A-1 (The numerical value described in each repeating unit represents the content (% by mass) of each repeating unit with respect to all the repeating units, which was 43% by mass, 27% by mass, and 30% by mass from the left repeating unit. In addition, the weight-average molecular weight was 69,800)

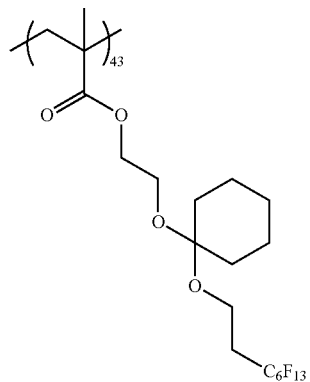

-continued

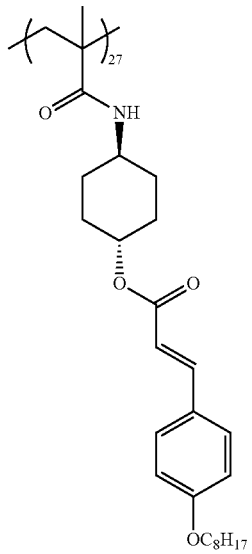

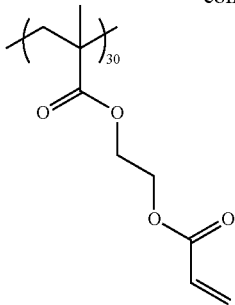

Surfactant B-1 (Weight-Average Molecular Weight: 2,200)

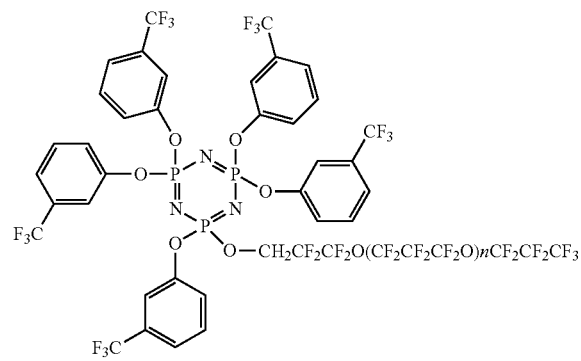

(Formation of Optically Anisotropic Layer (1b))

Next, a composition (1b) for forming an optically anisotropic layer containing a rod-like liquid crystal compound having the following composition was applied onto the above prepared optically anisotropic layer (1c) by using a geeser coating machine, and heated with hot air at 80° C. for 60 seconds. Subsequently, the obtained composition layer was irradiated with UV (500 mJ/cm$^2$) at 80° C. to immobilize the alignment of the liquid crystal compound to form an optically anisotropic layer (1b) corresponding to the optically anisotropic layer (B).

The optically anisotropic layer (1b) had a thickness of 1.2 And of 164 nm at a wavelength of 550 nm, and a twisted angle of the liquid crystal compound of 81°. Assuming that the width direction of the film is defined as 0° (the longitudinal direction of the film is defined as 90°), the alignment axial angle of the liquid crystal compound was 14° on the air side and 95° on the side in contact with the optically anisotropic layer (1c), in a case of viewing from the optically anisotropic layer (1b) side.

The alignment axial angle of the liquid crystal compound contained in the optically anisotropic layer is expressed as negative in a case where it is clockwise (right-handed turning) and positive in a case where it is counterclockwise (left-handed turning) with the width direction of the substrate as a reference of 0°, upon observing the substrate from the surface side of the optically anisotropic layer.

In addition, the twisted angle of the liquid crystal compound is expressed as negative in a case where the alignment axis direction of the liquid crystal compound on the substrate side (back side) is clockwise (right-handed turning) and positive in a case where it is counterclockwise (left-handed turning) with reference to the alignment axis direction of the liquid crystal compound on the surface side (front side), upon observing the substrate from the surface side of the optically anisotropic layer.

| Composition (1b) for forming optically anisotropic layer | |
|---|---|
| Rod-like liquid crystal compound (A) given above | 100 parts by mass |
| Ethylene oxide-modified trimethylolpropane triacrylate (V# 360, manufactured by Osaka Organic Chemical Industry Ltd.) | 4 parts by mass |
| Photopolymerization initiator (IRGACURE 819, manufactured by BASF SE) | 3 parts by mass |
| Left-handed twisting chiral agent (L1) given below | 0.60 parts by mass |
| Fluorine-containing compound C given above | 0.08 parts by mass |
| Methyl ethyl ketone | 156 parts by mass |

Left-handed twisting chiral agent (L1)

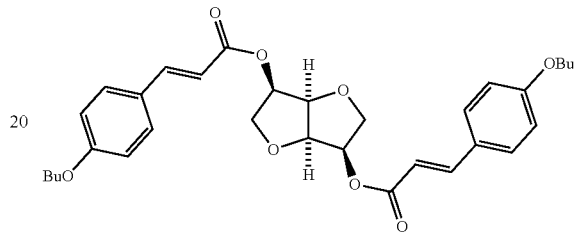

A laminate (1c-1b) in which the optically anisotropic layer (1c) and the optically anisotropic layer (1b) were directly laminated on an elongated cellulose acylate film was prepared by the above procedure. It was confirmed that the photo-alignment polymer was present in a case where the surface of the optically anisotropic layer (1c) on the side in contact with the optically anisotropic layer (1b) was examined by the above-mentioned method.

(Formation of Laminate of Optically Anisotropic Layer (A), Optically Anisotropic Layer (B), and Optically Anisotropic Layer (C))

The surface side of the optically anisotropic layer (1a) formed on the above prepared elongated cellulose acylate film, and the surface side of the optically anisotropic layer (1b) of the laminate (1c-1b) formed on the above prepared elongated cellulose acylate film were continuously bonded using an ultraviolet curable adhesive.

Subsequently, the cellulose acylate film on the optically anisotropic layer (1a) side was peeled off to expose the surface of the optically anisotropic layer (1a) in contact with the cellulose acylate film. In this manner, a phase difference film (1c-1b-1a) in which the optically anisotropic layer (1c), the optically anisotropic layer (1b), and the optically anisotropic layer (1a) were laminated in this order on an elongated cellulose acylate film was obtained. The thickness of the phase difference film (1c-1b-1a) was 4.0 The moisture content of the obtained phase difference film (1c-1b-1a) was 0.8%. The in-plane slow axis on the surface of the optically anisotropic layer (1b) on the optically anisotropic layer (1a) side was parallel to the in-plane slow axis of the optically anisotropic layer (1a).

(Preparation of Linearly Polarizing Plate 1)

The surface of a support of a cellulose triacetate film TJ25 (manufactured by Fujifilm Corporation, thickness: 25 μm) was subjected to an alkali saponification treatment. Specifically, the support was immersed in a 1.5 N sodium hydroxide aqueous solution at 55° C. for 2 minutes, washed in a water bath at room temperature, and further neutralized with 0.1 N sulfuric acid at 30° C. After neutralization, the support was washed in a water bath at room temperature and further dried with hot air at 100° C. to obtain a polarizer protective film.

A roll-like polyvinyl alcohol (PVA) film having a thickness of 60 μm was continuously stretched in an aqueous iodine solution in a longitudinal direction and dried to obtain a polarizer having a thickness of 13 The luminosity corrected single transmittance of the polarizer was 43%. At this time, the absorption axis direction and the longitudinal direction of the polarizer were the same.

The polarizer protective film was bonded to one surface of the polarizer using the following PVA adhesive to prepare a linearly polarizing plate 1.

(Preparation of PVA Adhesive)

100 parts by mass of a polyvinyl alcohol-based resin having an acetoacetyl group (average degree of polymerization: 1200, degree of saponification: 98.5 mol %, degree of acetoacetylation: 5 mol %) and 20 parts by mass of methylol melamine were dissolved in pure water under a temperature condition of 30° C. to prepare a PVA adhesive as an aqueous solution adjusted to a concentration of solid contents of 3.7% by mass.

(Preparation of Circularly Polarizing Plate)

The surface of the optically anisotropic layer (1a) of the above prepared elongated phase difference film (1c-1b-1a) and the surface of the polarizer of the above prepared elongated linearly polarizing plate 1 (the surface opposite to the polarizer protective film) were continuously bonded to each other using an ultraviolet curable adhesive. Subsequently, the cellulose acylate film on the optically anisotropic layer (1c) side was peeled off to expose the surface of the optically anisotropic layer (1c) in contact with the cellulose acylate film.

In this manner, a circularly polarizing plate (P1) consisting of the phase difference film (1c-1b-1a) and the linearly polarizing plate was prepared. At this time, the polarizer protective film, the polarizer, the optically anisotropic layer (1a), the optically anisotropic layer (1b), and the optically anisotropic layer (1c) were laminated in this order, and the angle formed by the absorption axis of the polarizer and the slow axis of the optically anisotropic layer (1a) was 76°. In addition, the alignment axial angle of the liquid crystal compound on the optically anisotropic layer (1a) side of the optically anisotropic layer (1b) was 14° with the width direction as a reference of 0°, which coincided with the slow axis direction of the optically anisotropic layer (1a). The thickness of the circularly polarizing plate was 43 μm.

The alignment axial angle of the liquid crystal compound contained in the optically anisotropic layer is expressed as negative in a case where it is clockwise (right-handed turning) and positive in a case where it is counterclockwise (left-handed turning) with the width direction of the linearly polarizing plate as a reference of 0°, upon being observed from the surface side of the polarizing plate.

Example 2

(Formation of Alignment Film)

The photo-alignment film forming material described in Example 1 of WO2016/002722A was applied onto the above prepared elongated cellulose acylate film. Then, the coating film was cured by heating to 125° C. with hot air. Next, the obtained coating film was irradiated with polarized ultraviolet rays having a wavelength of 313 nm to prepare a photo-alignment film.

(Formation of Optically Anisotropic Layer (B))

The composition (1b) for forming an optically anisotropic layer containing a rod-like liquid crystal compound having the foregoing composition was applied onto the above prepared photo-alignment film using a geeser coating machine, and heated with hot air at 80° C. for 60 seconds. Subsequently, the obtained composition layer was irradiated with UV (500 mJ/cm$^2$) at 80° C. to immobilize the alignment of the liquid crystal compound to form an optically anisotropic layer (2b) corresponding to the optically anisotropic layer (B).

The optically anisotropic layer (2b) had a thickness of 1.2 And of 164 nm at a wavelength of 550 nm, and a twisted angle of the liquid crystal compound of 81°. Assuming that the width direction of the film is defined as 0° (the longitudinal direction of the film is defined as 90°), the alignment axial angle of the liquid crystal compound was −76° on the air side and 5° on the side in contact with the cellulose acylate film, in a case of viewing from the optically anisotropic layer (2b) side.

The alignment axial angle of the liquid crystal compound contained in the optically anisotropic layer is expressed as negative in a case where it is clockwise (right-handed turning) and positive in a case where it is counterclockwise (left-handed turning) with the width direction of the substrate as a reference of 0°, upon observing the substrate from the surface side of the optically anisotropic layer.

In addition, the twisted angle of the liquid crystal compound is expressed as negative in a case where the alignment axis direction of the liquid crystal compound on the substrate side (back side) is clockwise (right-handed turning) and positive in a case where it is counterclockwise (left-handed turning) with reference to the alignment axis direction of the liquid crystal compound on the surface side (front side), upon observing the substrate from the surface side of the optically anisotropic layer.

(Formation of Laminate of Optically Anisotropic Layer (C) and Optically Anisotropic Layer (A))

(Formation of Optically Anisotropic Layer (2c))

An optically anisotropic layer (2c) having an alignment control ability on the surface thereof was formed in the same manner as in the formation of the optically anisotropic layer (1c) of Example 1, except that the thickness of the composition layer was changed.

The film thickness of the formed optically anisotropic layer (2c) was 0.7 The formed composition layer had an in-plane retardation Re of 0 nm at a wavelength of 550 nm and a thickness direction retardation Rth of −96 nm at a wavelength of 550 nm. It was confirmed that the average tilt angle of the major axis direction of the rod-like liquid crystal compound with respect to the film surface was 90° and the rod-like liquid crystal compound was aligned vertically to the film surface.

In this manner, an optically anisotropic layer (2c) corresponding to the optically anisotropic layer (C) was formed.

(Formation of Optically Anisotropic Layer (2a))

Next, a composition (2a) for forming an optically anisotropic layer containing a rod-like liquid crystal compound having the following composition was applied onto the above prepared optically anisotropic layer (2c) by using a geeser coating machine, and heated with hot air at 80° C. for 60 seconds. Subsequently, the obtained composition layer was irradiated with UV (500 mJ/cm$^2$) at 80° C. to immobilize the alignment of the liquid crystal compound to form an optically anisotropic layer (2a) corresponding to the optically anisotropic layer (A).

The optically anisotropic layer (2a) had a thickness of 1.2 In addition, the optically anisotropic layer (2a) had a retardation of 168 nm at a wavelength of 550 nm. It was confirmed that the average tilt angle of the major axis direction of the rod-like liquid crystal compound with respect to the film surface was 0° and the rod-like liquid crystal compound was aligned horizontally with respect to the film surface. In addition, assuming that the width direction of the film is defined as 0° (the longitudinal direction of the film is defined as 90°), the slow axis was −76° in a case of viewing from the optically anisotropic layer (2a) side.

| Composition (2a) for forming optically anisotropic layer | |
|---|---|
| Rod-like liquid crystal compound (A) given above | 100 parts by mass |
| Ethylene oxide-modified trimethylolpropane triacrylate (V# 360, manufactured by Osaka Organic Chemical Industry Ltd.) | 4 parts by mass |
| Photopolymerization initiator (IRGACURE 819, manufactured by BASF SE) | 3 parts by mass |
| Fluorine-containing compound C given above | 0.08 parts by mass |
| Methyl ethyl ketone | 156 parts by mass |

A laminate (2c-2a) in which the optically anisotropic layer (2c) and the optically anisotropic layer (2a) were directly laminated on an elongated cellulose acylate film was prepared by the above procedure. It was confirmed that the photo-alignment polymer was present in a case where the surface of the optically anisotropic layer (2c) on the side in contact with the optically anisotropic layer (2a) was examined by the above-mentioned method.

(Formation of Laminate of Optically Anisotropic Layer (A), Optically Anisotropic Layer (C) and Optically Anisotropic Layer (B), and Preparation of Circularly Polarizing Plate)

The surface of the optically anisotropic layer (2a) of the laminate (2c-2a) formed on the above prepared elongated cellulose acylate film, and the surface of the polarizer of the above prepared elongated linearly polarizing plate 1 (the surface opposite to the polarizer protective film) were continuously bonded to each other using an ultraviolet curable adhesive. Subsequently, the cellulose acylate film on the optically anisotropic layer (2c) side was peeled off to expose the surface of the optically anisotropic layer (2c) in contact with the cellulose acylate film.

The exposed surface of the optically anisotropic layer (2c) and the surface side of the optically anisotropic layer (2b) formed on the above prepared elongated cellulose acylate film were continuously bonded to each other using an ultraviolet curable adhesive. Subsequently, the cellulose acylate film on the optically anisotropic layer (2b) side was peeled off to expose the surface of the optically anisotropic layer (2b) in contact with the cellulose acylate film.

In this manner, a circularly polarizing plate (P2) consisting of the phase difference film (2b-2c-2a) and the linearly polarizing plate 1 was prepared. The thickness of the phase difference film (2b-2c-2a) was 4.0 µm. The moisture content of the obtained phase difference film (2b-2c-2a) was 0.8%. At this time, the polarizer protective film, the polarizer, the optically anisotropic layer (2a), the optically anisotropic layer (2c), and the optically anisotropic layer (2b) were laminated in this order, and the angle formed by the absorption axis of the polarizer and the slow axis of the optically anisotropic layer (2a) was 14°. In addition, the alignment axial angle of the liquid crystal compound on the optically anisotropic layer (2c) side of the optically anisotropic layer (2b) was 76° with the width direction as a reference of 0°, which coincided with the slow axis direction of the optically anisotropic layer (2a). The thickness of the circularly polarizing plate was 43 µm.

The alignment axial angle of the liquid crystal compound contained in the optically anisotropic layer is expressed as negative in a case where it is clockwise (right-handed turning) and positive in a case where it is counterclockwise (left-handed turning) with the width direction of the linearly polarizing plate as a reference of 0°, upon being observed from the surface side of the polarizing plate.

Comparative Example 1

An optically anisotropic layer (1c) was formed on an elongated cellulose acylate film in the same manner as in Example 1.

Next, an optically anisotropic layer (1h) containing a liquid crystal compound having reverse wavelength dispersibility was formed on the above prepared optically anisotropic layer (1c), using the composition A-1 described in Example 9 of WO2018/216812A. The retardation at a wavelength of 550 nm was 138 nm. It was confirmed that the average tilt angle of the major axis direction of the liquid crystal compound having reverse wavelength dispersibility with respect to the film surface was 0°, and the liquid crystal compound having reverse wavelength dispersibility was aligned horizontally with respect to the film surface. In addition, assuming that the width direction of the film is defined as 0° (the longitudinal direction of the film is defined as 90°), the slow axis was 45° in a case of viewing from the optically anisotropic layer (1h) side.

In this manner, a laminate in which the optically anisotropic layer (1c) containing a vertically aligned rod-like liquid crystal compound and the optically anisotropic layer (1h) containing a horizontally aligned liquid crystal compound having reverse wavelength dispersibility were directly laminated was prepared.

The linearly polarizing plate 1 prepared in the same manner as in Example 1 and the above prepared laminate containing the optically anisotropic layer (1c) and the optically anisotropic layer (1h) were continuously bonded to each other using an ultraviolet curable adhesive so that the surface of the optically anisotropic layer (1h) faces the surface of the polarizer of the linearly polarizing plate 1 (the surface opposite to the polarizer protective film). Subsequently, the cellulose acylate film on the optically anisotropic layer (1c) side was peeled off to expose the surface of the optically anisotropic layer (1c) in contact with the cellulose acylate film.

In this manner, a circularly polarizing plate consisting of a linearly polarizing plate was prepared. At this time, the polarizer protective film, the polarizer, the optically anisotropic layer (1h), and the optically anisotropic layer (1c) were laminated in this order, and the angle formed by the absorption axis of the polarizer and the slow axis of the optically anisotropic layer (1h) was 45°.

Comparative Example 2

An optically anisotropic layer (1c) was formed on an elongated cellulose acylate film in the same manner as in Example 1.

Next, an optically anisotropic layer (2h) was formed on the above prepared optically anisotropic layer (1c) by using the above-mentioned composition (2a) for forming an optically anisotropic layer. The retardation at a wavelength of 550 nm was 138 nm. It was confirmed that the average tilt angle of the major axis direction of the rod-like liquid crystal compound with respect to the film surface was 0° and the rod-like liquid crystal compound was aligned horizontally with respect to the film surface. In addition, assuming that the width direction of the film is defined as 0° (the longitudinal direction of the film is defined as 90°), the slow axis was 45° in a case of viewing from the optically anisotropic layer (2h) side.

In this manner, a laminate in which the optically anisotropic layer (1c) containing a vertically aligned rod-like liquid crystal compound and the optically anisotropic layer (2h) containing a horizontally aligned rod-like liquid crystal compound were directly laminated was prepared.

The linearly polarizing plate 1 prepared in the same manner as in Example 1 and the above prepared laminate containing the optically anisotropic layer (1c) and the optically anisotropic layer (2h) were continuously bonded to each other using an ultraviolet curable adhesive so that the surface of the optically anisotropic layer (2h) faces the surface of the polarizer of the linearly polarizing plate 1 (the surface opposite to the polarizer protective film). Subsequently, the cellulose acylate film on the optically anisotropic layer (1c) side was peeled off to expose the surface of the optically anisotropic layer (1c) in contact with the cellulose acylate film.

In this manner, a circularly polarizing plate consisting of a linearly polarizing plate was prepared. At this time, the polarizer protective film, the polarizer, the optically anisotropic layer (2h), and the optically anisotropic layer (1c) were laminated in this order, and the angle formed by the absorption axis of the polarizer and the slow axis of the optically anisotropic layer (2h) was 45°.

Comparative Example 3

(Formation of Optically Anisotropic Layer (3h))

The alignment film disposed on a cellulose acylate film used in the preparation of the optically anisotropic layer A of Example 1 was continuously subjected to a rubbing treatment. At this time, the longitudinal direction and the transport direction of the elongated film were parallel, and the angle between the film longitudinal direction (transport direction) and the rubbing roller rotation axis was 75°. In a case where the film longitudinal direction (transport direction) is 90° and the clockwise direction is represented by a positive value with reference to a film width direction as a reference (0°) in a case of being observed from the film side, the rotation axis of the rubbing roller is at 165°.

The same optically anisotropic layer coating liquid (1a) as in Example 1 was applied onto the rubbing-treated alignment film using a geeser coating machine to form an optically anisotropic layer (3h) corresponding to the optically anisotropic layer (A).

The optically anisotropic layer (3h) had a thickness of 2.0 μm. In addition, the optically anisotropic layer (3h) had a retardation of 250 nm at a wavelength of 550 nm. It was confirmed that the average tilt angle of the disc plane of the disk-like liquid crystal compound with respect to the film surface was 90°, and the disk-like liquid crystal compound was aligned vertically to the film surface. In addition, assuming that the angle of the slow axis of the optically anisotropic layer (3h) is parallel to the rotation axis of the rubbing roller, and the width direction of the film is defined as 0° (the counterclockwise direction is defined as 90° and the clockwise direction is defined as −90° in a longitudinal direction), the slow axis was 165° in a case of viewing from the optically anisotropic layer (3h) side.

(Formation of Optically Anisotropic Layer (4h))

The alignment film disposed on a cellulose acylate film used in the preparation of the optically anisotropic layer A of Example 1 was continuously subjected to a rubbing treatment. At this time, the longitudinal direction and the transport direction of the elongated film were parallel, and the angle between the film longitudinal direction (transport direction) and the rubbing roller rotation axis was 75°.

In a case where the film longitudinal direction (transport direction) is 90° and the clockwise direction is represented by a positive value with reference to a film width direction as a reference (0°) in a case of being observed from the film side, the rotation axis of the rubbing roller is at 165°.

The same composition (1a) for forming an optically anisotropic layer as in Example 1 was applied onto the rubbing-treated alignment film using a geeser coating machine to form an optically anisotropic layer (4h) corresponding to the optically anisotropic layer (A).

The optically anisotropic layer (4h) had a thickness of 0.8 μm. In addition, the optically anisotropic layer (4h) had a retardation of 120 nm at a wavelength of 550 nm. It was confirmed that the average tilt angle of the major axis of the rod-like liquid crystal compound with respect to the film surface was 0° and the rod-like liquid crystal compound was aligned horizontally with respect to the film surface. In addition, assuming that the angle of the slow axis of the optically anisotropic layer (4h) is parallel to the rotation axis of the rubbing roller, and the width direction of the film is defined as 0° (the counterclockwise direction is defined as 90° and the clockwise direction is defined as −90° in a longitudinal direction), the slow axis was 105° in a case of viewing from the optically anisotropic layer (4h) side.

The linearly polarizing plate 1 prepared in the same manner as in Example 1 and the cellulose acylate film on which the optically anisotropic layer (3h) was disposed were continuously bonded to each other using an ultraviolet curable adhesive so that the surface of the optically anisotropic layer (3h) faces the surface of the polarizer of the linearly polarizing plate 1 (the surface opposite to the polarizer protective film). Subsequently, the cellulose acylate film on the optically anisotropic layer (3h) side was peeled off to expose the surface of the optically anisotropic layer (3h) in contact with the cellulose acylate film. The exposed surface of the optically anisotropic layer (3h) and the surface side of the optically anisotropic layer (4h) formed on the above prepared elongated cellulose acylate film were continuously bonded to each other using an ultraviolet curable adhesive. Subsequently, the cellulose acylate film on the optically anisotropic layer (4h) side was peeled off to expose the surface of the optically anisotropic layer (4h) in contact with the cellulose acylate film.

In this manner, a circularly polarizing plate consisting of a linearly polarizing plate was prepared. At this time, the polarizer protective film, the polarizer, the optically anisotropic layer (3h), and the optically anisotropic layer (4h) were laminated in this order, and the angle formed by the absorption axis of the polarizer and the slow axis of the optically anisotropic layer (3h) was 75°.

Comparative Example 4

A cellulose acylate film (3c) was prepared in the same manner as in Example 15 of JP2006-265309A, except that stretching was not carried out instead of the optically anisotropic layer (1c) of Example 1. Re and Rth were equivalent to those of the optically anisotropic layer (1c).

The cellulose acylate film (3c) was subjected to an alkali saponification treatment to form an alignment film, and then an optically anisotropic layer (3b) was formed. The optically anisotropic layer (3b) was prepared in the same manner as the optically anisotropic layer (1b) of Example 1, except that the optically anisotropic layer (1c) of Example 1 was changed to the above-mentioned cellulose acylate film (3c).

The surface side of the optically anisotropic layer (1a) prepared in Example 1 and the surface side of the above prepared optically anisotropic layer (3b) were continuously bonded to each other using an ultraviolet curable adhesive. Then, the cellulose acylate film on the optically anisotropic layer (1a) side was peeled off to obtain a phase difference film (3c-3b-1a). The obtained phase difference film had a moisture content of 2.1% and a thickness of 303 µm.

The surface of the optically anisotropic layer (1a) of the above prepared elongated phase difference film (3c-3b-1a) and the surface of the polarizer of the above prepared elongated linearly polarizing plate 1 (the surface opposite to the polarizer protective film) were continuously bonded to each other using an ultraviolet curable adhesive.

In this manner, a circularly polarizing plate consisting of the phase difference film (3c-3b-1a) and the linearly polarizing plate was prepared. At this time, the polarizer protective film, the polarizer, the optically anisotropic layer (1a), the optically anisotropic layer (3b), and the optically anisotropic layer (3c) were laminated in this order, and the angle formed by the absorption axis of the polarizer and the slow axis of the optically anisotropic layer (1a) was 76°. In addition, the alignment axial angle of the liquid crystal compound on the optically anisotropic layer (1a) side of the optically anisotropic layer (3b) was 14° with the width direction as a reference of 0°, which coincided with the slow axis direction of the optically anisotropic layer (1a). The thickness of the circularly polarizing plate was 342 µm.

<Measurement of Chromaticity and Reflectivity>

An aluminum foil was attached to a PET film having a thickness of 100 µm using a pressure-sensitive adhesive sheet to prepare a reflective substrate.

Each of the circularly polarizing plates prepared in Examples and Comparative Examples was placed on the aluminum foil side of the obtained reflective substrate to obtain a laminate (corresponding to the specific laminate). The reflective substrate and the circularly polarizing plate were laminated so that the phase difference film of the circularly polarizing plate and the aluminum foil faced each other. Observing from the circularly polarizing plate side in the obtained laminate, the chromaticity a* and the chromaticity b* were measured at all azimuthal angles (0° to 360°) with a polar angle of 40° from the normal direction of the circularly polarizing plate of the laminate, using a spectrophotometric colorimeter (manufactured by Konica Minolta, Inc.). In addition, the reflectivity was measured at all azimuthal angles (0° to 360°) with a polar angle of 40° from the normal direction of the circularly polarizing plate of the laminate, according to the procedure described above.

The angle of the azimuthal angle represents an angle formed with the absorption axis of the polarizer, with reference to the absorption axis of the polarizer. In addition, in a case of expressing the azimuthal angle, the counterclockwise direction is represented by a positive value with reference to the absorption axis direction of the polarizer as viewed from the circularly polarizing plate side of the obtained laminate.

<Preparation of Organic EL Display Device>
(Mounting on Display Device)

The FlexPai (manufactured by Royole Corporation) equipped with an organic EL display panel (organic EL display element) was disassembled, and a circularly polarizing plate was peeled off from the organic EL display device. Next, the circularly polarizing plate prepared above was bonded to the isolated organic EL display panel on the panel side using a pressure sensitive adhesive so that the protective film was disposed on the outside, thereby preparing an organic EL display device.

(Evaluation of Display Performance)
(Front Direction)

The prepared organic EL display device was brought into a black display state and observed from the front direction under bright light in a state where the display was spread out, and the tint unevenness was evaluated according to the following standards. The results are shown in Table 1.

A: No tint unevenness is visible (acceptable).
B: Slight tint unevenness is visible, but there is no problem in use (acceptable).
C: Tint unevenness is visible, and there is a problem in use.

(Oblique Direction)

The prepared organic EL display device was brought into a black display state and observed at all azimuthal angles from an oblique direction under bright light in a state where the display was bent, and the tint unevenness was evaluated according to the following standards. The results are shown in Table 1.

A: No tint unevenness is visible (acceptable).
B: Slight tint unevenness is visible, but there is no problem in use (acceptable).
C: Tint unevenness is visible, and there is a problem in use.

(Evaluation Over Time)

The prepared organic EL display device was left to stand in an environment with a temperature of 25° C. and a relative humidity of 10% for 72 hours and then the organic EL display device was brought into a black display state, and the tint unevenness was evaluated according to the following standards under bright light in a state where the display was bent. The results are shown in Table 1.

A: There was no change over time
B: There was a change over time

In Table 1, in the column of "Type of liquid crystal compound", "Disk-like" means that the optically anisotropic layer is a layer formed of a disk-like liquid crystal compound, "Rod-like" means that the optically anisotropic layer is a layer formed of a rod-like liquid crystal compound, and "Reverse wavelength dispersibility" means that the optically anisotropic layer is a layer formed of a liquid crystal compound having reverse wavelength dispersibility.

In the column of "Alignment state", "Horizontal" means that the liquid crystal compound is horizontally aligned. "Twisted" means that the liquid crystal compound is twist-aligned. "Vertical" means that the liquid crystal compound is vertically aligned.

In Table 1, the column of "Reflectivity" represents the reflectivity at all azimuthal angles measured in the foregoing section of <Measurement of chromaticity and reflectivity>, "<X %" means that the reflectivity at any azimuthal angle is less than X %, and ">Y %" means that the reflectivity at any azimuthal angle is more than Y %.

In Table 1, the column of "a*" represents the absolute value of the chromaticity a* at all azimuthal angles measured in the foregoing section of <Measurement of chromaticity and reflectivity>, "<X" means that the absolute value of the chromaticity a* at any azimuthal angle is less than X, and ">Y" means that the absolute value of the chromaticity a* at any azimuthal angle is more than Y.

In Table 1, the column of "b*" represents the absolute value of the chromaticity b* at all azimuthal angles measured in the foregoing section of <Measurement of chromaticity and reflectivity>, "<X" means that the absolute value of the chromaticity b* at any azimuthal angle is less than X, and ">Y" means that the absolute value of the chromaticity b* at any azimuthal angle is more than Y.

TABLE 1

|  | Laminate of optically anisotropic layers | Type of liquid crystal compound | Alignment state | Reflec-tivity | a* | b* | Moisture content (%) | Evaluation of organic EL display performance | | |
|---|---|---|---|---|---|---|---|---|---|---|
|  |  |  |  |  |  |  |  | Front direction | Oblique direction | Evaluation over time |
| Example 1 | A(1a) | Disk-like | Vertical | <3% | <8 | <8 | 0.8 | A | A | A |
|  | B(1b) | Rod-like | Twisted |  |  |  |  |  |  |  |
|  | C(1c) | Rod-like | Vertical |  |  |  |  |  |  |  |
| Example 2 | A(2a) | Rod-like | Horizontal | <3% | <10 | <10 | 0.8 | A | B | A |
|  | C(2c) | Rod-like | Vertical |  |  |  |  |  |  |  |
|  | B(2b) | Rod-like | Twisted |  |  |  |  |  |  |  |
| Comparative Example 1 | A(1h) | Reverse wavelength dispersibility | Horizontal | >4% | <10 | >15 | — | A | C | A |
|  | C(1c) | Rod-like | Vertical |  |  |  |  |  |  |  |
| Comparative Example 2 | A(2h) | Rod-like | Horizontal | >4% | >15 | >15 | — | C | C | A |
|  | C(1c) | Rod-like | Vertical |  |  |  |  |  |  |  |
| Comparative Example 3 | A(3h) | Disk-like | Vertical | >4% | >15 | >15 | — | A | C | A |
|  | A(4h) | Rod-like | Horizontal |  |  |  |  |  |  |  |
| Comparative Example 4 | A(3c) | (Cellulose acylate film) | — | <3% | <8 | <8 | 2.1 | A | A | B |
|  | A(3b) | Rod-like | Twisted |  |  |  |  |  |  |  |
|  | A(1a) | Rod-like | Vertical |  |  |  |  |  |  |  |

From the results shown in Table 1 above, it was confirmed that the circularly polarizing plate according to the embodiment of the present invention was capable of suppressing the tint unevenness in a front direction and an oblique direction in a case where the circularly polarizing plate was used in an organic EL display device. In addition, the occurrence of tint unevenness over time was also suppressed. On the other hand, the circularly polarizing plates of Comparative Examples did not obtain a desired effect in a case where the circularly polarizing plate was used in an organic EL display device.

Example 3

A phase difference film (1c-1b-1a) in which the optically anisotropic layer (1c), the optically anisotropic layer (1b), and the optically anisotropic layer (1a) were laminated in this order on an elongated cellulose acylate film was obtained in the same manner as in Example 1.

Next, a polarizer formed of a dichroic organic coloring agent and polymerizable liquid crystals was prepared as the linearly polarizing plate 3. A coating liquid PA1 for forming an alignment layer, which will be described later, was continuously applied onto a cellulose triacetate film TJ40 (manufactured by Fujifilm Corporation, thickness: 40 μm) with a wire bar. The support on which the coating film was formed was dried with hot air at 140° C. for 120 seconds, and then the coating film was irradiated with polarized ultraviolet rays (10 mJ/cm², using an ultra-high pressure mercury lamp) to form a photo-alignment layer PA1 to obtain a TAC film with the photo-alignment layer PA1.

The film thickness of the photo-alignment layer PA1 was 0.3

| Coating liquid PA1 for forming alignment layer | |
|---|---|
| Polymer PA-1 shown below | 100.00 parts by mass |
| Acid generator PAG-1 shown below | 5.00 parts by mass |
| Acid generator CPI-110TF shown below | 0.005 parts by mass |
| Xylene | 1220.00 parts by mass |
| Methyl isobutyl ketone | 122.00 parts by mass |

Polymer PA-1

-continued

Coating liquid PA1 for forming alignment layer

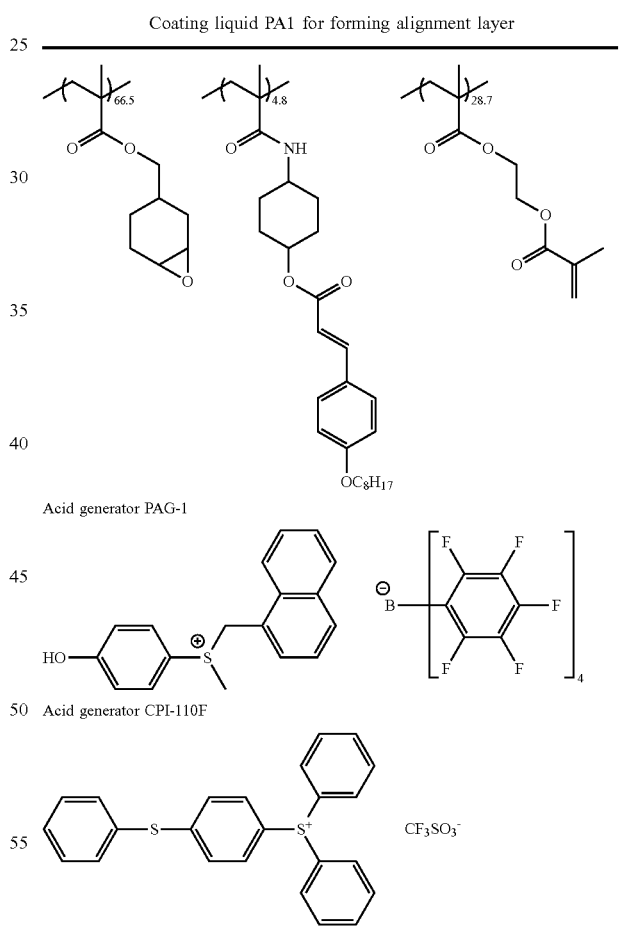

Acid generator PAG-1

Acid generator CPI-110F

The following composition P2 for forming a light absorption anisotropic layer was continuously applied onto the obtained photo-alignment layer PA1 with a wire bar to form a coating film P2.

Next, the coating film P2 was heated at 140° C. for 30 seconds, and then the coating film P2 was cooled to room temperature (23° C.).

Next, the obtained coating film P2 was heated at 90° C. for 60 seconds and cooled again to room temperature.

Then, a light absorption anisotropic layer P2 was prepared on the photo-alignment layer PA1 by irradiating with a light emitting diode (LED) lamp (central wavelength: 365 nm) for 2 seconds under an irradiation condition of an illuminance of 200 mW/cm².

The film thickness of the light absorption anisotropic layer P2 was 1.3

| Composition P2 for forming light absorption anisotropic layer | |
|---|---|
| Dichroic coloring agent D-4 shown below | 0.25 parts by mass |
| Dichroic coloring agent D-5 shown below | 0.36 parts by mass |
| Dichroic coloring agent D-6 shown below | 0.59 parts by mass |
| Polymer liquid crystal compound P-1 shown below | 2.21 parts by mass |
| Low-molecular-weight liquid crystalline compound M-1 shown below | 1.36 parts by mass |
| Polymerization initiator (IRGACURE OXE-02, manufactured by BASF SE) | 0.150 parts by mass |
| Surfactant F-1 shown below | 0.026 parts by mass |
| Cyclopentanone | 46.00 parts by mass |
| Tetrahydrofuran | 46.00 parts by mass |
| Benzyl alcohol | 3.00 parts by mass |

Dichroic coloring agent D-4

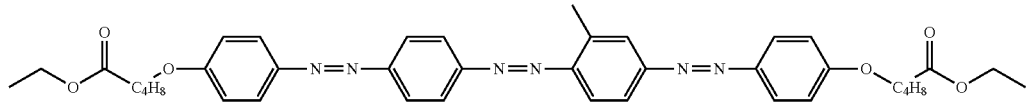

Dichroic coloring agent D-5

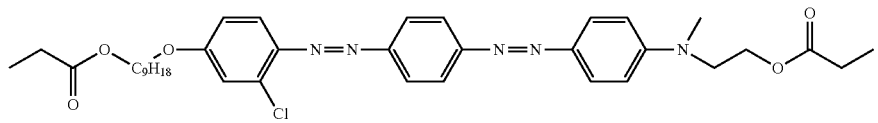

Dichroic coloring agent D-6

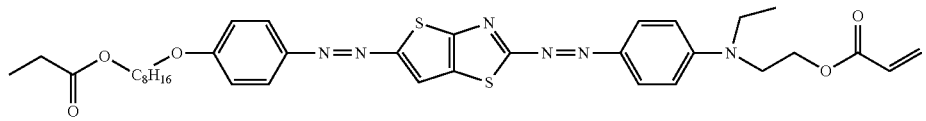

Polymer liquid crystal compound P-1

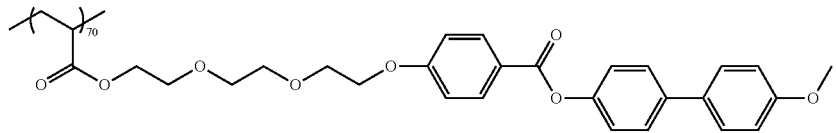

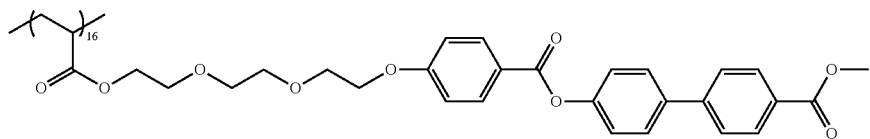

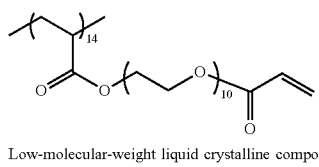

Low-molecular-weight liquid crystalline compound M-1

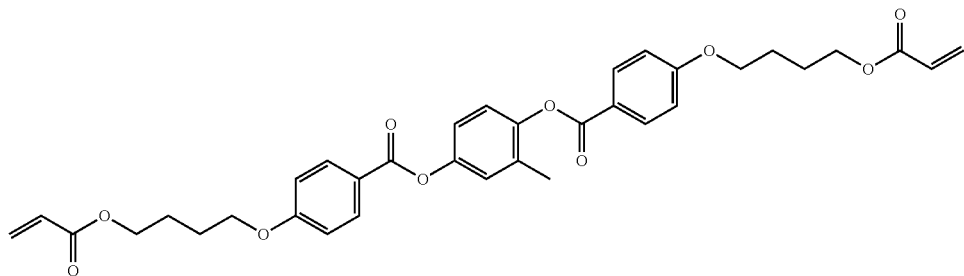 [SMILES: C=CC(=O)OCCCCOc1ccc(C(=O)Oc2ccc(OC(=O)c3ccc(OCCCCOC(=O)C=C)cc3)c(C)c2)cc1]

| Composition P2 for forming light absorption anisotropic layer |
|---|

Surfactant F-1

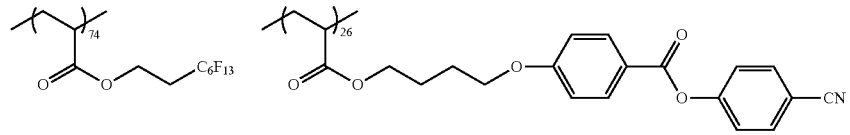

The following composition K1 for forming a cured layer was continuously applied onto the obtained light absorption anisotropic layer P2 with a wire bar to form a coating film.

Next, the coating film was dried at room temperature, and then irradiated for 15 seconds under an irradiation condition of an illuminance of 28 mW/cm² using a high-pressure mercury lamp to prepare a cured layer K1 on the light absorption anisotropic layer P2.

The film thickness of the cured layer K1 was 0.05

| Composition K1 for forming cured layer | |
|---|---|
| Mixture L1 of rod-like liquid crystal compounds shown below | 2.61 parts by mass |
| Modified trimethylolpropane triacrylate shown below | 0.11 parts by mass |
| Photopolymerization initiator I-1 shown below | 0.05 parts by mass |
| Surfactant F-3 shown below | 0.21 parts by mass |
| Methyl isobutyl ketone | 297 parts by mass |

Mixture L1 of rod-like liquid crystal compounds (The numerical value in the following formulae represents % by mass, and R represents a group bonded through an oxygen atom.)

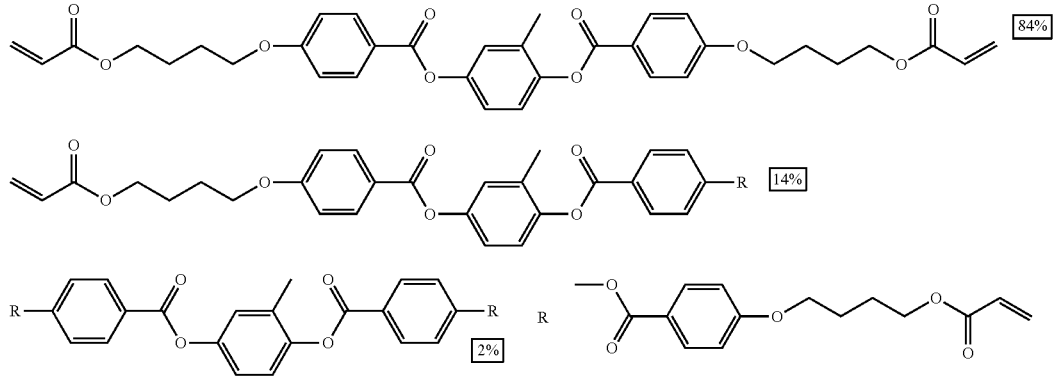

Modified trimethylolpropane triacrylate

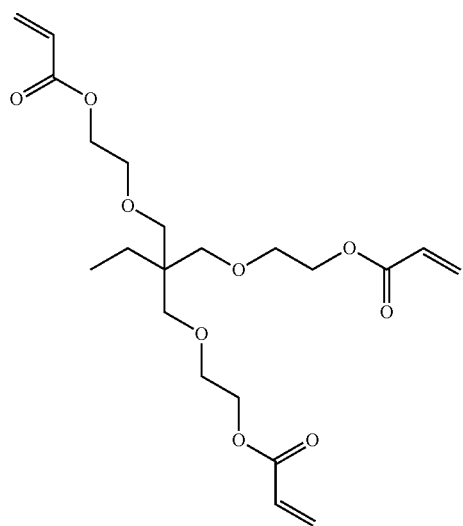 [SMILES: C=CC(=O)OCCOCC(CC)(COCCOC(=O)C=C)COCCOC(=O)C=C]

| Composition K1 for forming cured layer |
|---|

Photopolymerization initiator I-1

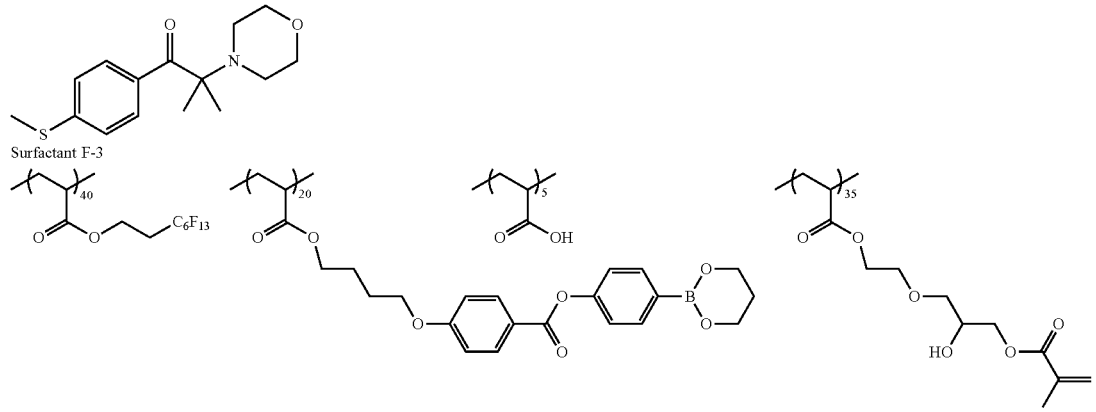

Surfactant F-3

The following composition B2 for forming an oxygen blocking layer was continuously applied onto the cured layer K1 with a wire bar. This was followed by drying with hot air at 100° C. for 2 minutes to form an oxygen blocking layer B2 having a thickness of 1.0 μm on the cured layer K1 to prepare a polarizing film including the light absorption anisotropic layer P2.

The luminosity corrected single transmittance of the polarizing film was 43%.

| Composition B2 for forming oxygen blocking layer | |
|---|---|
| Modified polyvinyl alcohol shown below | 3.80 parts by mass |
| Initiator IRGACURE 2959 | 0.20 parts by mass |
| Water | 70 parts by mass |
| Methanol | 30 parts by mass |

Modified polyvinyl alcohol

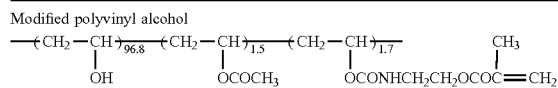

The oxygen blocking layer B2 side of the polarizing film and the polarizing plate protective film were bonded to each other using a pressure-sensitive adhesive sheet. After that, only TJ40 of the polarizing film was peeled off, and the peeled surface was continuously bonded to the surface of the optically anisotropic layer (1a) of the elongated phase difference film (1c-1b-1a) using an ultraviolet curable adhesive. Subsequently, the cellulose acylate film of the optically anisotropic layer (1c) was peeled off to expose the surface of the optically anisotropic layer (1c) in contact with the cellulose acylate film. In this manner, a circularly polarizing plate was prepared. The thickness of the circularly polarizing plate was 38 μm.

Example 4

A circularly polarizing plate was prepared in the same manner as in Example 3, except that the film thickness of the light absorption anisotropic layer P2 in Example 3 was set to 0.8

The luminosity corrected single transmittance of the polarizing film was 45%. The thickness of the circularly polarizing plate was 37

(Evaluation of Display Performance)

In a case where the circularly polarizing plate of Example 3 or 4 was mounted on an organic EL display device in the same manner as in Example 1, the display performance equivalent to that of Example 1 was confirmed. Further, it is possible to reduce the thickness of the entire circularly polarizing plate, and it is possible to improve a yield ratio in a case of carrying out irregular shape processing such as in a curved screen display.

Example 5

(Preparation of Circularly Polarizing Plate Using High-Refractive Adhesive)

The surface side of the optically anisotropic layer (1a) formed on the elongated cellulose acylate film prepared in the same manner as in Example 1, and the surface side of the optically anisotropic layer (1b) of the laminate (1c-1b) formed on the above prepared elongated cellulose acylate film were continuously bonded using an ultraviolet curable adhesive. An adhesive with high-refractive monomer added to acrylic compound to control the refractive index after curing to 1.53 was used as the ultraviolet curable adhesive. The difference between the refractive index averaged in the axis direction of the adjacent optically anisotropic layer and the refractive index of the adhesive was within 0.08. A circularly polarizing plate was prepared in the same manner as in Example 1, except that the refractive index was controlled.

Example 6

A circularly polarizing plate was prepared in the same manner as in Example 1, using an ultraviolet curable adhesive having a refractive index controlled to 1.58 after curing in the same manner as in Example 5. The difference between the refractive index averaged in the axis direction of the adjacent optically anisotropic layer and the refractive index of the adhesive was within 0.05.

Example 7

An ultraviolet curable adhesive having a refractive index controlled to 1.53 was prepared in the same manner as in Example 5. The surface of the optically anisotropic layer (1a) of the elongated phase difference film (1c-1b-1a) prepared in Example 5 and the surface of the polarizer of the above prepared elongated linearly polarizing plate 1 (the surface opposite to the polarizer protective film) were continuously bonded to each other using an ultraviolet curable adhesive having a refractive index controlled to 1.53 after curing. A circularly polarizing plate was prepared in the same manner as in Example 5, except for such a refractive index control. The difference between the average refractive index of the polarizer and the refractive index of the adhesive was within 0.05.

(Evaluation of Display Performance)

In a case where the polarizing plate of each of Examples 5, 6 and 7 was mounted on an organic EL display device in the same manner as in Example 1, the display performance equivalent to that of Example 1 was confirmed.

EXPLANATION OF REFERENCES 1, 2: phase difference film
10, 20: circularly polarizing plate
1a, 2a: optically anisotropic layer (A)
1b, 2b: optically anisotropic layer (B)
1c, 2c: optically anisotropic layer (C)
3: polarizer
30: aluminum sheet
40: specific laminate

What is claimed is:

1. A circularly polarizing plate comprising: a polarizer; and a phase difference film laminated on one surface side of the polarizer, wherein the phase difference film has a moisture content of 1.8% or less, wherein a chromaticity a* and a chromaticity b* are measured at all azimuthal angles with a polar angle of 40° from a normal direction of the circularly polarizing plate of a laminate which is obtained by bonding the circularly polarizing plate to an aluminum sheet so that the phase difference film in the circularly polarizing plate faces the aluminum sheet, an absolute value of the chromaticity a* and an absolute value of the chromaticity b* are 10 or less at any azimuthal angle, and wherein a reflectivity is measured at all azimuthal angles with a polar angle of 40° from the normal direction of the circularly polarizing plate of the laminate, the reflectivity is 3.0% or less at any azimuthal angle.

2. The circularly polarizing plate according to claim 1, wherein the phase difference film includes an optically anisotropic layer (B) formed by fixing a twist-aligned rod-like liquid crystal compound with a thickness direction as a helical axis.

3. The circularly polarizing plate according to claim 1, wherein the phase difference film includes an optically anisotropic layer (A) exhibiting negative uniaxiality.

4. The circularly polarizing plate according to claim 1, wherein the phase difference film has a thickness of 30 μm or less.

5. The circularly polarizing plate according to claim 1, wherein the phase difference film is formed by laminating three optically anisotropic layers.

6. The circularly polarizing plate according to claim 1, wherein the phase difference film is formed by laminating three optically anisotropic layers which are formed by fixing an aligned liquid crystal compound.

7. The circularly polarizing plate according to claim 1, wherein the polarizer is formed of a composition containing a polymerizable liquid crystal compound, and the polarizer has a thickness of 8 μm or less.

8. An organic electroluminescent display device comprising:
the circularly polarizing plate according to claim 1.

9. A display device comprising:
the circularly polarizing plate according to claim 1,
wherein the circularly polarizing plate is disposed along a curved surface of the display device.

* * * * *